(12) United States Patent
Kurokawa et al.

(10) Patent No.: US 9,595,891 B2
(45) Date of Patent: Mar. 14, 2017

(54) CONTROL DEVICE AND CONTROL DEVICE OF POWER CONVERSION CIRCUIT

(71) Applicant: Nagasaki University, Nagasaki-shi, Nagasaki (JP)

(72) Inventors: Fujio Kurokawa, Nagasaki (JP); Tsukasa Takahashi, Tokyo (JP); Kouta Bansyou, Tokyo (JP); Tooru Tanaka, Tokyo (JP)

(73) Assignee: NAGASAKI UNIVERSITY, Nagasaki-Shi, Nagasaki (JP)

( * ) Notice: Subject to any disclaimer, the term of this patent is extended or adjusted under 35 U.S.C. 154(b) by 49 days.

(21) Appl. No.: 14/389,743

(22) PCT Filed: Mar. 29, 2013

(86) PCT No.: PCT/JP2013/059780
§ 371 (c)(1),
(2) Date: Sep. 30, 2014

(87) PCT Pub. No.: WO2013/147278
PCT Pub. Date: Oct. 3, 2013

(65) Prior Publication Data
US 2015/0162849 A1 Jun. 11, 2015

(30) Foreign Application Priority Data
Mar. 31, 2012 (JP) .................. 2012-083410

(51) Int. Cl.
*H02M 3/157* (2006.01)
*H02M 7/539* (2006.01)
(Continued)

(52) U.S. Cl.
CPC ............. *H02M 7/539* (2013.01); *H02M 1/08* (2013.01); *H02M 3/156* (2013.01); *H02M 3/158* (2013.01);
(Continued)

(58) Field of Classification Search
CPC ...... H02M 3/156; H02M 3/157; H02M 3/158; H02M 3/1588
See application file for complete search history.

(56) References Cited

U.S. PATENT DOCUMENTS 5,617,016 A * 4/1997 Borghi .................... G05F 1/575
323/282

FOREIGN PATENT DOCUMENTS

JP 2006-136169 5/2006
JP 2007-318914 12/2007
(Continued)

OTHER PUBLICATIONS

English translation of Fast Proportion Digital Control Circuit for DC/DC Converter; Yuki Maeda et al.; vol. 110, No. 393 Published on Jan. 20, 2011.*

(Continued)

*Primary Examiner* — Timothy J Dole
*Assistant Examiner* — Ishrat Jamali
(74) *Attorney, Agent, or Firm* — Kile Park Reed & Houtteman PLLC

(57) ABSTRACT

Provided are a control device and a control device for a power conversion circuit, said control device having a first control circuit that compensates for detection delays in an analog-to-digital conversion circuit of a second control circuit that compensates for response delays of the integral element and the derivative element of the first control circuit. A first control circuit (212), which has a first analog-to-digital converter at the input stage thereof, generates an amount of time, which is a first control amount, on the basis of sampling information for a controlled object, and applies an operation initiation signal to a second control circuit (222) when a period of time, lasting for the first control amount, has passed from a prescribed reference time. After the operation initiation signal has been input, the second control circuit (222), which has a second analog-to-digital converter at the input stage thereof, generates an amount of (Continued)

time, which is a second control amount, on the basis of sampling information for the controlled object, and outputs a switch-switching signal when a period of time, lasting for the second control amount, has passed from the time the operation initiation signal was input.

14 Claims, 27 Drawing Sheets

(51) Int. Cl.
    *H02M 3/158*     (2006.01)
    *H02M 1/08*     (2006.01)
    *H02M 3/156*     (2006.01)
    *H02M 1/00*     (2006.01)

(52) U.S. Cl.
    CPC .... *H02M 3/157* (2013.01); *H02M 2001/0009* (2013.01); *H02M 2001/0012* (2013.01)

(56) References Cited

FOREIGN PATENT DOCUMENTS

| WO | 2011/093500 | 8/2011 |
|----|-------------|--------|
| WO | 2011/122686 | 10/2011 |
| WO | 2013/039250 | 3/2013 |

OTHER PUBLICATIONS

English translation of Dynamic Characteristics Improvement by Novel Peak-Current Injected Digital Control in DC-DC Converter ;Yoshihiko Komichi et al.;vol. 111, No. 400 published on Jan. 18, 2012.*
English translation of Digital Peak Current Mode DC-DC Converter; Kazuhiro Kajiwara, et al.; IEE-HCA; vol. No. 112; Issue No. 60(EE2012 1-4); Year: 2012.*
Yuki Maeda et al., "Fast Proportion Digital Control Circuit for DC-DC Converter", IEICE Technical Report, vol. 110, No. 393, pp. 73 to 77, and English Abstract; dated Jan. 20, 2011.
Yoshihiko Komichi et al., "Dynamic Characteristics Improvement by a Novel Peak-Current Injected Digital Control in DC-DC Converter", IEICE Technical Report, vol. 111, No. 400, pp. 1 to 5, and English Abstract; dated Jan. 18, 2012.
Kazuhiro Kajiwara et al., "Digital Peak Current Mode DC-DC Converter", IEICE Technical Report, vol. 112, No. 60, pp. 19 to 22 and English Abstract; dated May 18, 2012.
Ryuya Yoshida et al., "Fast Digital PID Control for DC-DC Converter", IEICE Technical Report, vol. 112, No. 60, pp. 13 to 17 and English Abstract; dated May 18, 2012.

* cited by examiner a,b: detecting signals of the controlled object (analog signals)
a*: a desired value of the first control variable
b*: a desired value of the second control variable
$S_1$: a pulse signal
$S_2$: a pulse signal (a switch timing signal)
DRV: a switch driving signal

*Fig. 4* a,b: detecting signals of the controlled object (analog signals)
A: the 1st control variable (the digital value of analog variable a)
B: the 2nd control variable (the digital value of analog variable b)
A*: a desired value of the 1st control variable
B*: a desired value of the 2nd control variable
$S_1$: a pulse signal
$S_2$: a pulse signal (a switch timing signal)
DRV: a switch driving signal

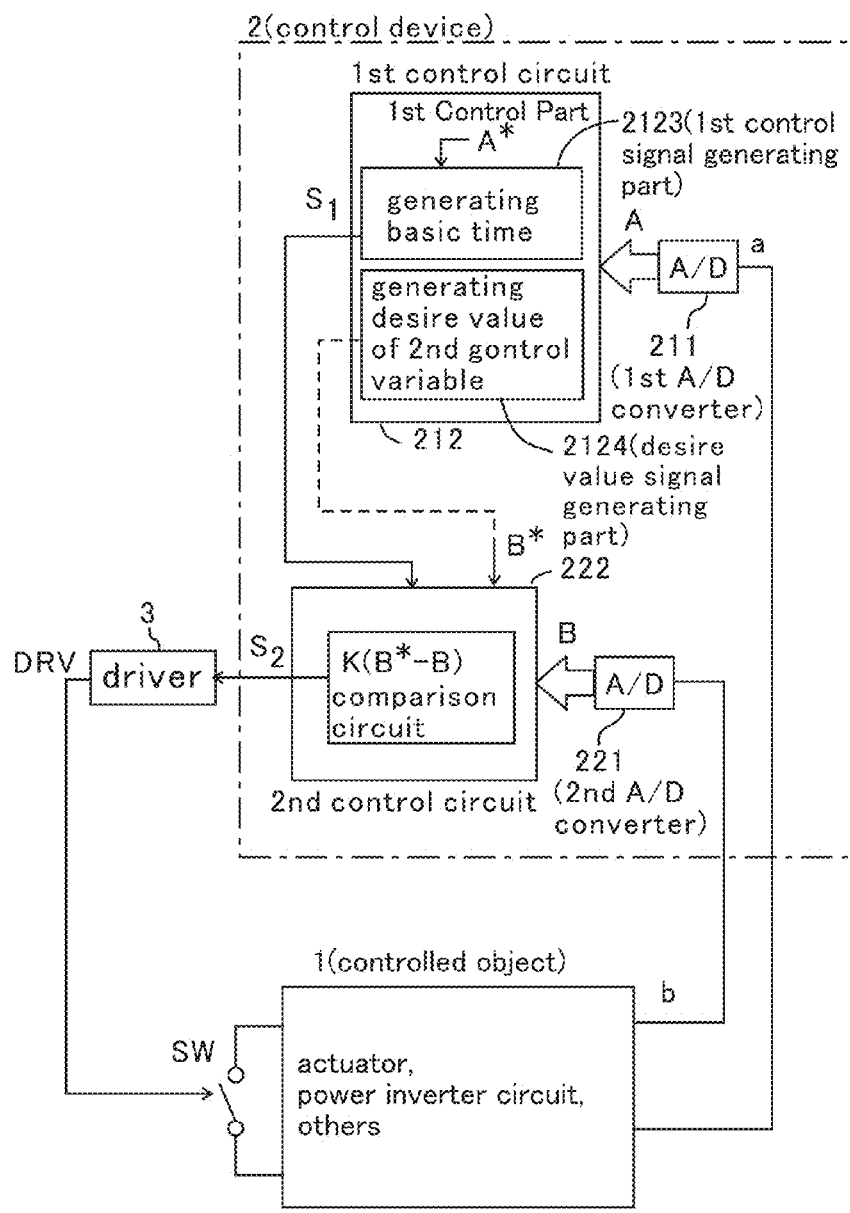

a,b: detecting signals of the controlled object (analog signals)
A: the 1st control variable (the digital value of analog variable a)
A*: a desired value of the 1st control variable
$TH_b$: a threshold value of integration circuit (time constant $\tau$)
$S_1$: a pulse signal
$S_2$: a pulse signal (a switch timing signal)
DRV: a switch driving signal

*Fig. 12*
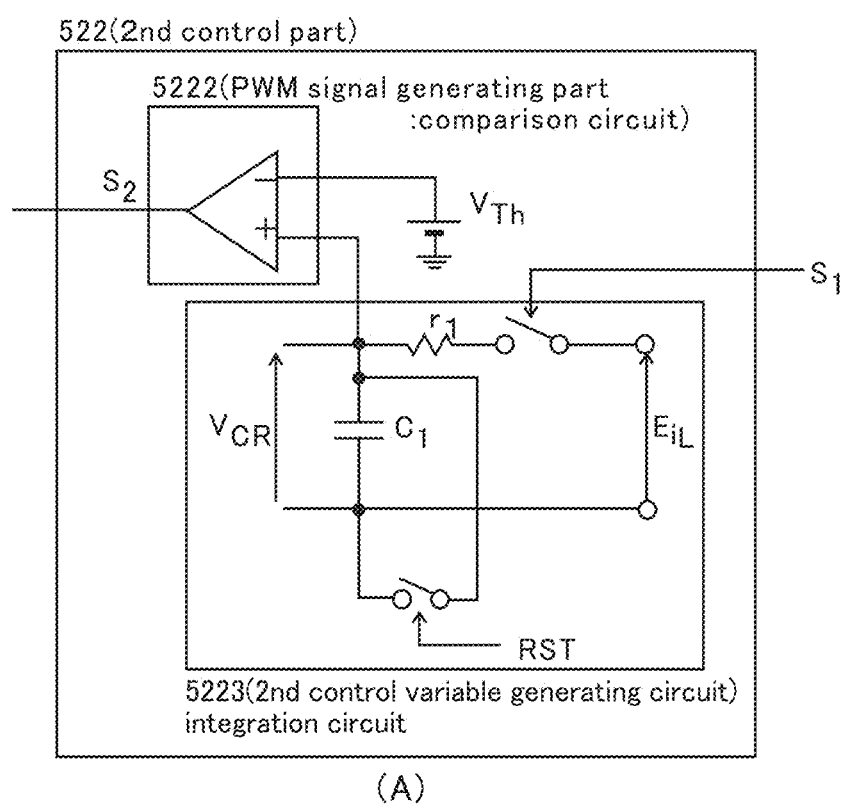
(A)
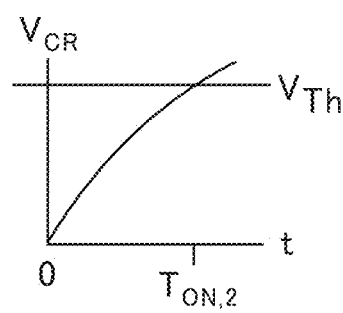
(B)

*Fig. 18*
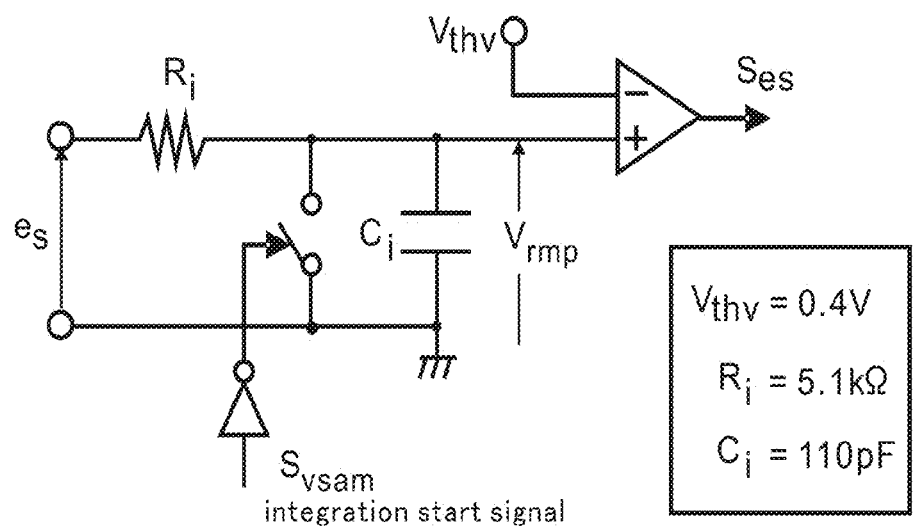
(A)
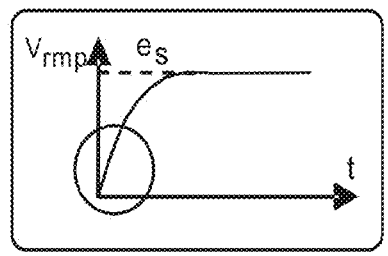
(B)
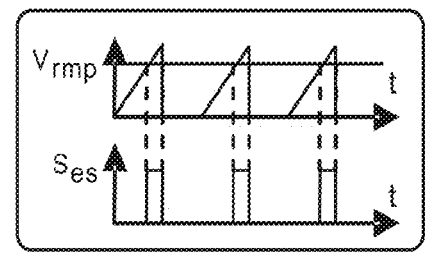
(C)

*Fig. 20*
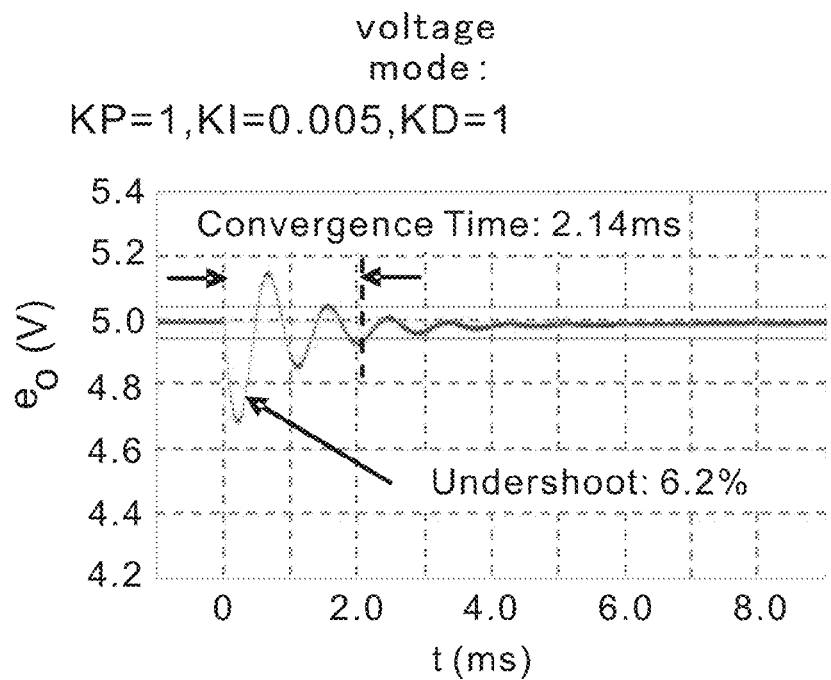
(A)
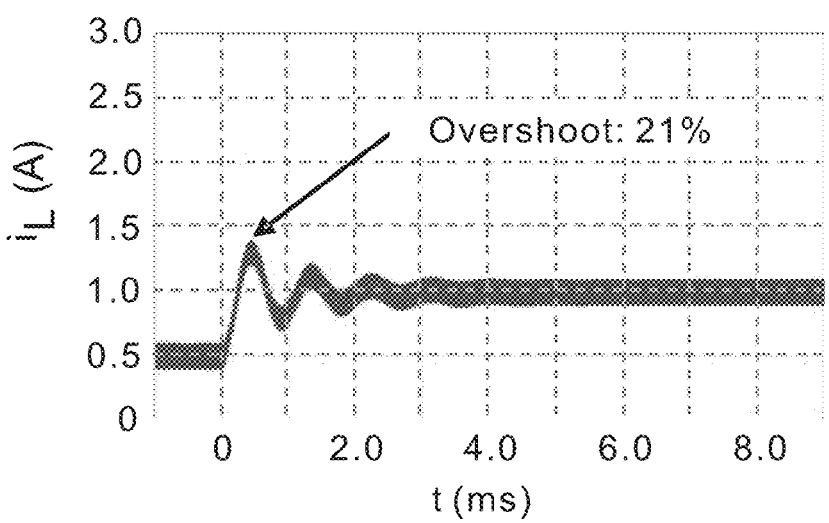
(B)

*Fig. 21*
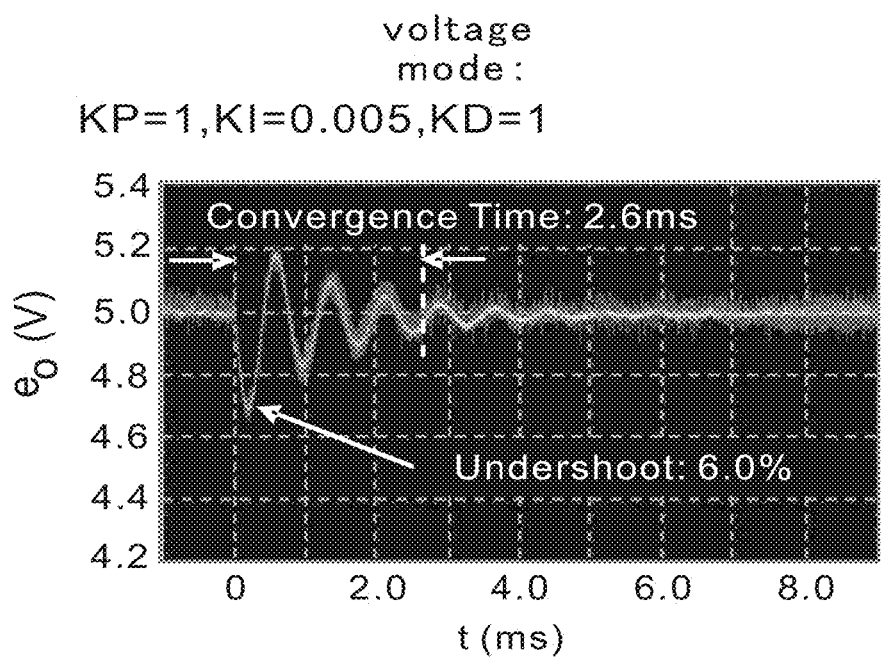
(A)
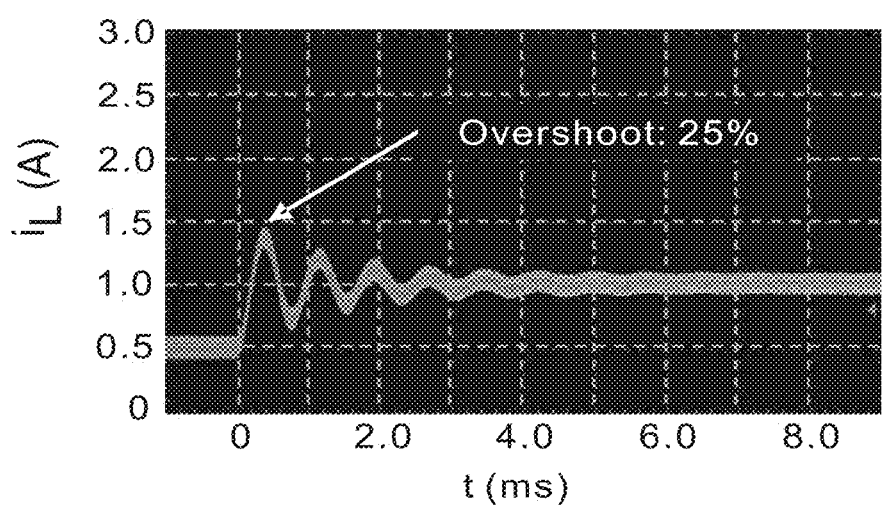
(B)

*Fig. 22*
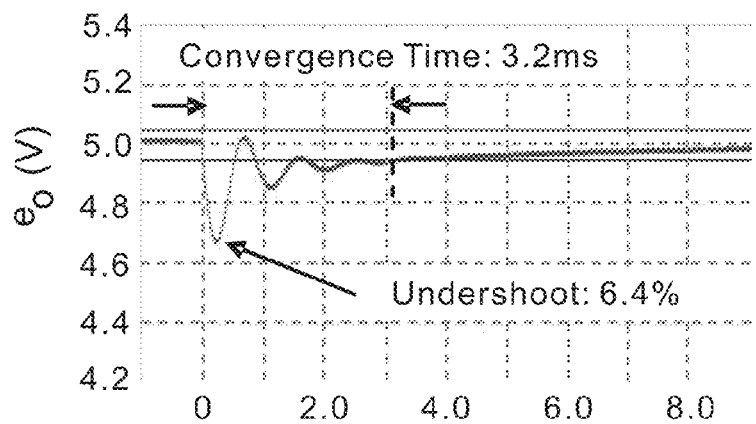
(A)
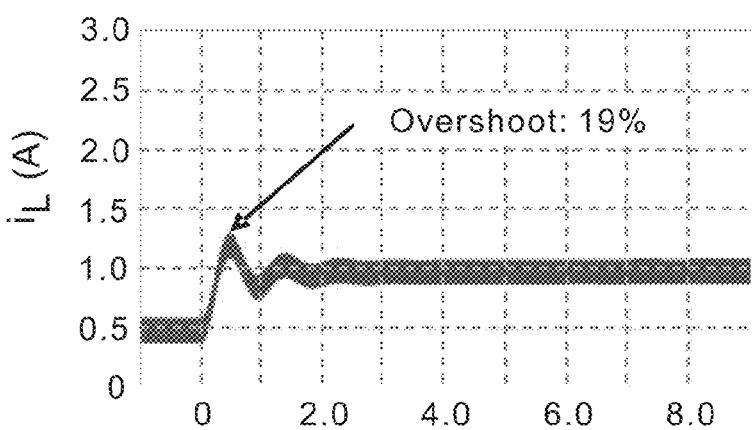
(B)

*Fig. 23*
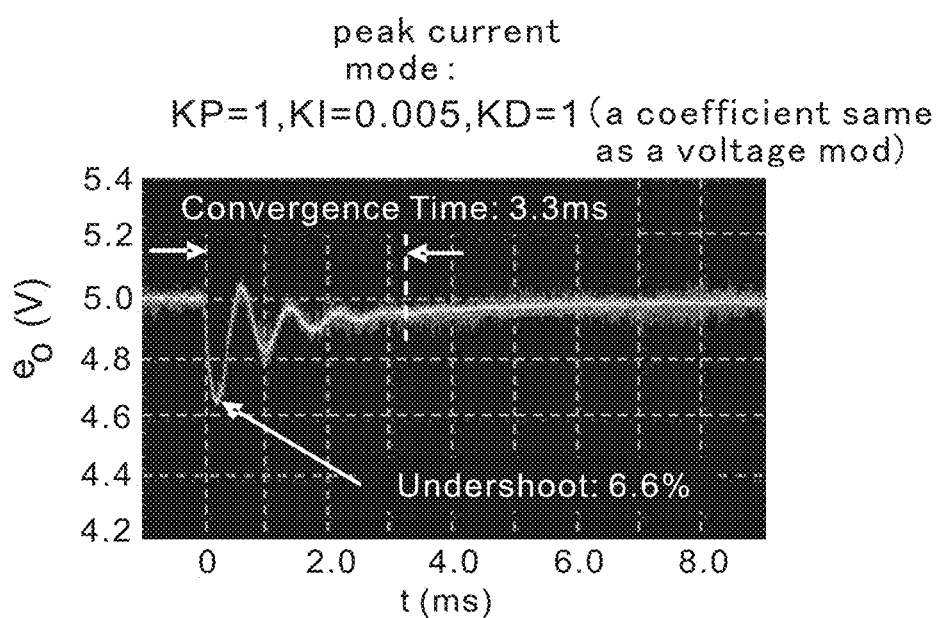
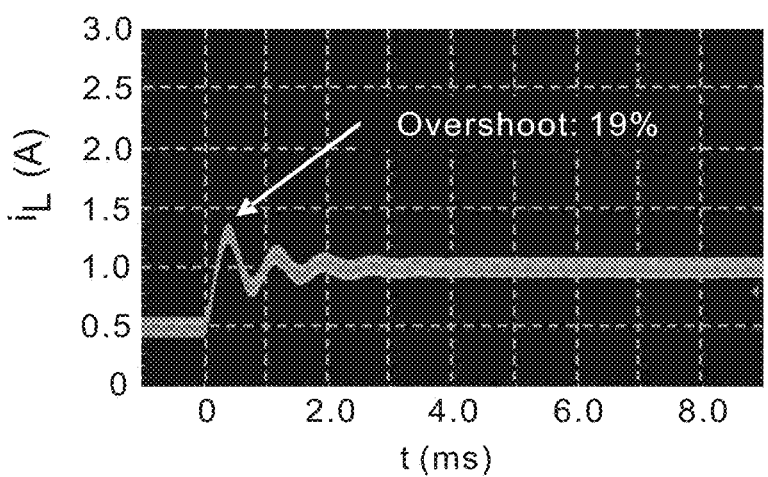

*Fig. 24*
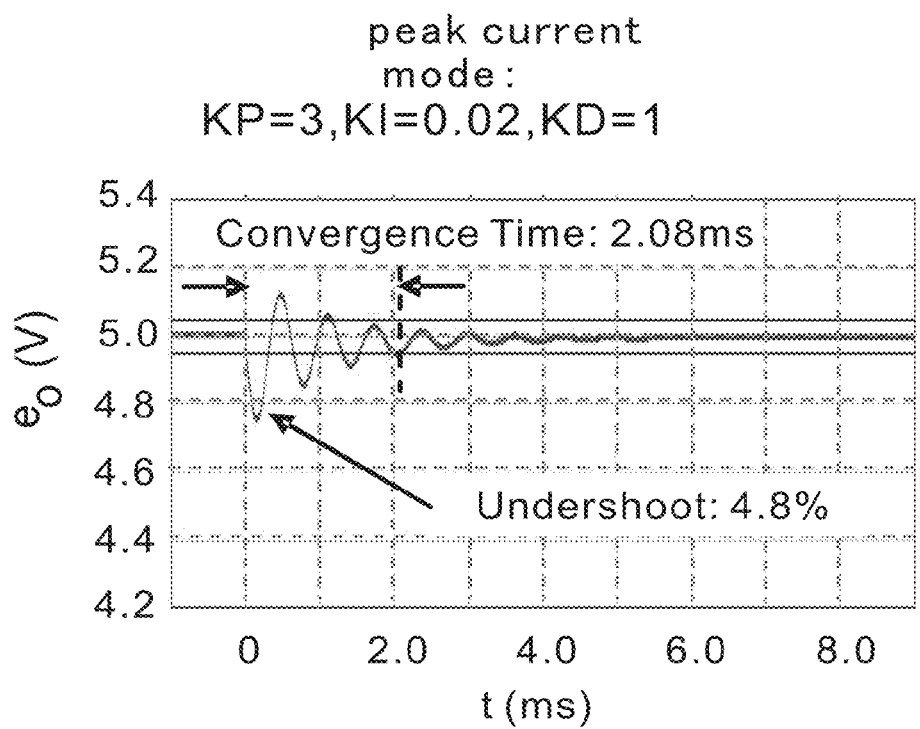
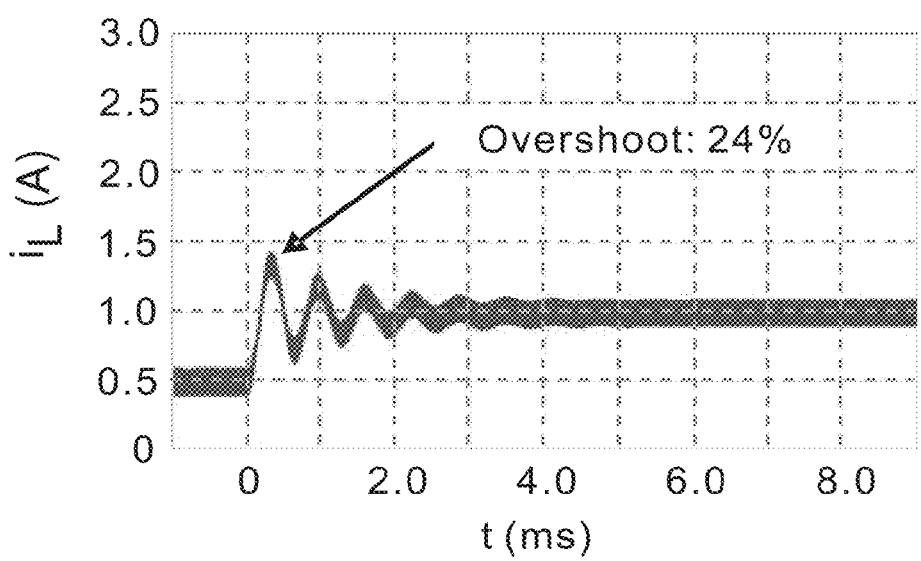

CONTROL DEVICE AND CONTROL DEVICE OF POWER CONVERSION CIRCUIT

FIELD OF THE INVENTION

The present invention relates to a control device and a control device of a power inverter circuit.

The control device comprises a first control circuit and a second control circuit.

The first control circuit the second control circuit starts an operation when the circuit received an operation start signal (trigger).

The first control circuit compensates for detection delay of the second control circuit.

On the other hand, the second control circuit compensates for a response delay of the first control circuit.

BACKGROUND ART

FIG. 26 shows a conventional DC/DC converter 8 and a conventional control device 91.

The DC/DC converter 8 shown in FIG. 26 is a depression type DC/DC converter.

FIG. 26 is an explanatory diagram showing the concern of an output voltage eo, an inductor current (iL) and an operating state of a switch SW.

The control device 91 detects the output voltage eo of the DC/DC converter 8 and the inductor current iL.

Wherein the inductor current iL is a voltage drop of a resistance rL for detecting the inductor current.

A digital detected value of output voltage eo is defined as Eo, and a digital detected value of the inductor current iL is defined as IL.

The control device 91 calculates a PID control variable based on a multiplication values (Eo*IL) of these detected values.

Specifically, the control device 91 determines a timing when the electric switch SW turns off.

An ON-time Ton of the electric switch SW is determined by the timing being determined.

And the control device 91 can control the electric switch SW via a drive circuitry 92.

In the DC/DC converter 8 shown in FIG. 26, it assumes that the output voltage eo gradually rose.

Or in the DC/DC converter 8, it assumes that the inductor current iL gradually increased.

When the output voltage eo is over a desire value eo*, the inductor current is over a desire value iL*.

The desire value iL* is a value that converted the output desire voltage eo* into a current iL.

In this case, the control device 91 controls a rise of output voltage eo by hastening an off-timing of electric switch SW.

On the other hand, in the DC/DC converter 8 shown in FIG. 26, it assumes that output voltage eo gradually fell, or a value of the inductor current iL gradually decreased.

Then it assumes that the inductor current iL was less than a desire value iL*.

As a result, inductor current iL may decrease from desired value iL*.

In this case, the control device 91 inhibits a decrease of the output voltage eo by delaying an off-timing of switch SW.

DISCLOSURE OF INVENTION

Problem to be Solved by the Invention

A PID control variable includes a D element (differentiation element) and an I element (integration element).

In the control device 91 shown in FIG. 26, the D element and the I element include one or more information about the past change timings of the electric switch.

The information about the past change timings of a electric switch are past detected values of output voltage eo.

Thus, in a control based on the D element and/or the I element, a delay occurs for the response.

A control part of the control device 91 shown in FIG. 26 detects the inductor current iL through an A/D converter (shown as "the A/D" in FIG. 26).

The control part can compare this detected value with the desired value IL* of the inductor current digitally.

However, the detection by the A/D translate circuit is accompanied with delay.

Therefore, the control device 91 cannot control with high accuracy.

Of course the detection delay shortens by using a high-speed A/D converter.

However, the high-speed A/D converter is extremely expensive.

Therefore, it is not realistic "to use the high-speed A/D converter which a detection delay does not occur".

The control part of a control device 91 shown in FIG. 26 can include an analog integrating circuit.

By using an analog integrating circuit, an inductor current iL and an inductor current desired value iL* are compared (it is not illustrated).

However, in this case a detection delay occurs.

An object of the invention is that the first control circuit compensates for a detection delay of the A/D translate circuit of the second control circuit.

An object of the invention is that the second control circuit compensates for the response delay of an integration element and a differentiation element of the first control circuit.

That is, the object of the present invention is to provide the control device and the control device of the power inverter circuit.

Means for Solving Problem

The control device controls voltage using an inverter by performing pressure up of circuitry.

(1)

A control device which controls an output of a controlled object by driving at least one switch in the controlled object by using an on-signal and an off-signal comprising:

a first control circuit which consists of a first control variable generating part and a first control signal generating part, wherein the first control variable generating part receives one or more first detecting signals, and generates a first time value as a first control variable based on the first detecting signal, the first control signal generating part outputs the first control signal to a second control circuit when the first time value passed from a time that received the first control signal from the first control circuit;

a second control circuit which consists of a second control variable generating part and a second control signal generating part, wherein the second control variable generating part receives one or more second detecting signals, and generates a second time value as a second control variable based on the second detecting signal, the second control signal generating part outputs the second control signal to a on-off signal generating circuit when the second time value passed from a time that received the first control signal from the first control circuit; and the on-off signal generation circuit which receives the second control signal from the second control circuit, and generates the ON signal and the OFF signal.

In the present invention, the first control circuit determines a timing of the operation start of the second control circuit.

This timing is made by the operation start signal that the first control circuit outputs to the second control circuit.

That is, the first control circuit can change an operation start timing of the second control circuit.

In the present invention, the second control circuit detects a second sampling information, and a detection delay of the second sampling information is compensated for by the first control circuit.

That is, the second control circuit receives an operation start signal, and outputs a value after a certain time passed.

The first control circuit determines a start time of the certain time.

That is, the first control circuit changes the sampling start time of the second A/D converter.

An A/D conversion effect (value of the IL) of the second A/D converter may not reach the desired value of the second sampling information.

In this case, the first control circuit can increase the second controlled variable by delaying a start timing of the A/D conversion (an output of the operation start signal is delayed).

An A/D conversion effect (value of the IL) of the second A/D converter may beyond the desired value of the second sampling information.

In this case, the first control circuit can shorten the time variable which is the second controlled variable by advancing a start timing of the A/D conversion (an output of the operation start signal is advanced).

(2)

A control device according to (1):

wherein the first controlled variable that the first controlled variable part generates is the controlled variable including one or both of an integral control element and the derivative control element, and the second above controlled variable that the second above controlled variable part generates is a proportional control element.

(3)

A control device according to (1): wherein the first control circuit is a digital circuit comprising an A/D converter which converts a first detection signal into a digital signal, the first control signal generating part is a counter circuit which counts a value of the first time generated by the first control value generating part and outputs a count-up signal when the counter counts up.

The control device as claimed in (1) including being the counter circuit which outputs a count up signal when the first control signal section counts a value at the first above time when the first controlled variable section was formed, and a count was improved.

The first control circuit changes the integral calculus start point of the analog integrating circuit of the second control circuit.

In other words, the desired value (this desired value can be set optionally) that an integral calculus level is determined by the second sampling information is reached, and the first control circuit can lengthen the amount of time that is the second control variable by slowing the integral calculus start timing of the analog integrating circuit of the second control circuit (output of the operation initiation timing is delayed).

In addition, the first control circuit can make a start timing of an AD conversion early when the AD conversion effect (a value of the IL) is beyond a desired value.

The operation start signal is output early, and the second controlled variable thereby shortens.

(4)

A control device according to (1): wherein the second control circuit includes a CR integration circuit, and the second control signal section is a voltage comparator which compares a predetermined threshold voltage with an output voltage of the CR integration circuit.

(5)

A control device according to (4): wherein a first control signal which a first control circuit outputs includes information to set a time constant of the CR integration circuit, or includes information to change a threshold of the voltage comparator.

(6)

A control device according to (1): wherein a second control circuit is a digital circuit comprising an A/D converter which converts a second detection signal into a digital signal, the second control circuit comprises a digital comparator which compares the predetermined voltage with the output of the A/D converter and a delay circuit to delay the output signal of the digital comparator.

(7)

A control device according to (6): wherein a first control signal which the first control circuit outputs includes an operation start signal of the above A/D converter of the second control circuit.

(8)

A control device according to (6): wherein a first control signal which the first control circuit outputs includes information to set a delay time of the delay circuit.

(9)

A second control circuit is a digital circuit comprising a voltage control oscillator which inputs the second detection signal into the input side, the second control circuit counts the output pulses of the voltage control oscillator, and the counter which outputs a second control signal when a predetermined set value was reached is comprised.

(10)

A control device according to (9), wherein a first control signal which a first control circuit outputs includes an operation start signal of the voltage control oscillator.

(11)

A control device according to (9), wherein a first control signal which a first control circuit outputs includes information to set a preset value of the counter.

(12)

A control device of a power converter circuit according to (1), wherein the controlled object is a power converter circuit.

(13)

A control device of a power converter circuit according to (12), wherein the power converter circuit repeats accumulation and release of the energy to an inductor.

(14)

A control device of a power converter circuit which the power converter circuit repeats accumulation and release of the energy to an inductor according to (12);

a first detection signal includes a detection signal of an output voltage of the power converter circuit;

the second detection signal is a detection signal of a current flowing through the switch in the power converter circuit, or a detection signal of a current flowing through the inductor in the power converter circuit.

(15)

A control device of a power converter circuit which the power converter circuit repeats accumulation and release of the energy to an inductor according to (12);

a first control circuit generates a first controlled variable from information including at least output voltage of the power converter circuit, Reference value er where/increase does the inductor depending on increase/decrease of value iL of the current flowing and output voltage eo as for the second control circuit, the second control circuit generates the second controlled variable based on a difference of the current iL flowing through the inductor and the reference voltage er, wherein the voltage er increases corresponding to decrease of the voltage er or the voltage er increases corresponding to decrease of the voltage.

$$A1(EB-A(Eo-Er))$$

A: a constant
A1: a constant
EB: an off-set value
Eo: a digital value of output voltage value eo
Er: a digital value of reference voltage value er Effect of the Invention According to the present invention, the first control circuit compensates for the detection delay of the second control circuit, and the second control circuit can compensate for the response delay of the first control circuit.

That is, with the first control circuit and the second control circuit, a weak point (the response delay in the first control circuit, the detection delay in the second control circuit) that each has can be supplemented mutually.

The control device which can respond fast is thereby provided without using high-speed A/D converters.

The present invention can be used as a control device of the electric power controlling circuit.

In addition, the present invention can be used as a control device for actuators.

BRIEF DESCRIPTION OF DRAWINGS

FIG. 4 is a block diagram which shows the other example of the control device of the present invention.

FIG. 12 (A) is an explanatory diagram showing the second control circuit of the second embodiment.

FIG. 12 (B) is an operation explanatory diagram of the analog integrating circuit.

FIG. 18 (A) is a figure showing the integrating circuit in FIG. 16.

FIG. 18 (B) and FIG. 18 (C) are figures showing the circuit operation of FIG. 18 (A).

FIG. 20 is a drawing which shows a simulation effect of the voltage mode (a prior art).

FIG. 21 is a drawing which shows an experiment effect of the voltage mode (prior art).

FIG. 22 is a drawing which shows a simulation effect of the current mode (the present invention) by the parameter same as voltage mode (a prior art).

FIG. 23 is a drawing which shows an experiment effect of the current mode (the present invention) by the parameter same as voltage mode (a prior art).

FIG. 24 is a drawing which shows a simulation effect of the current mode (the present invention) by adjusted parameters.

Figure 26:
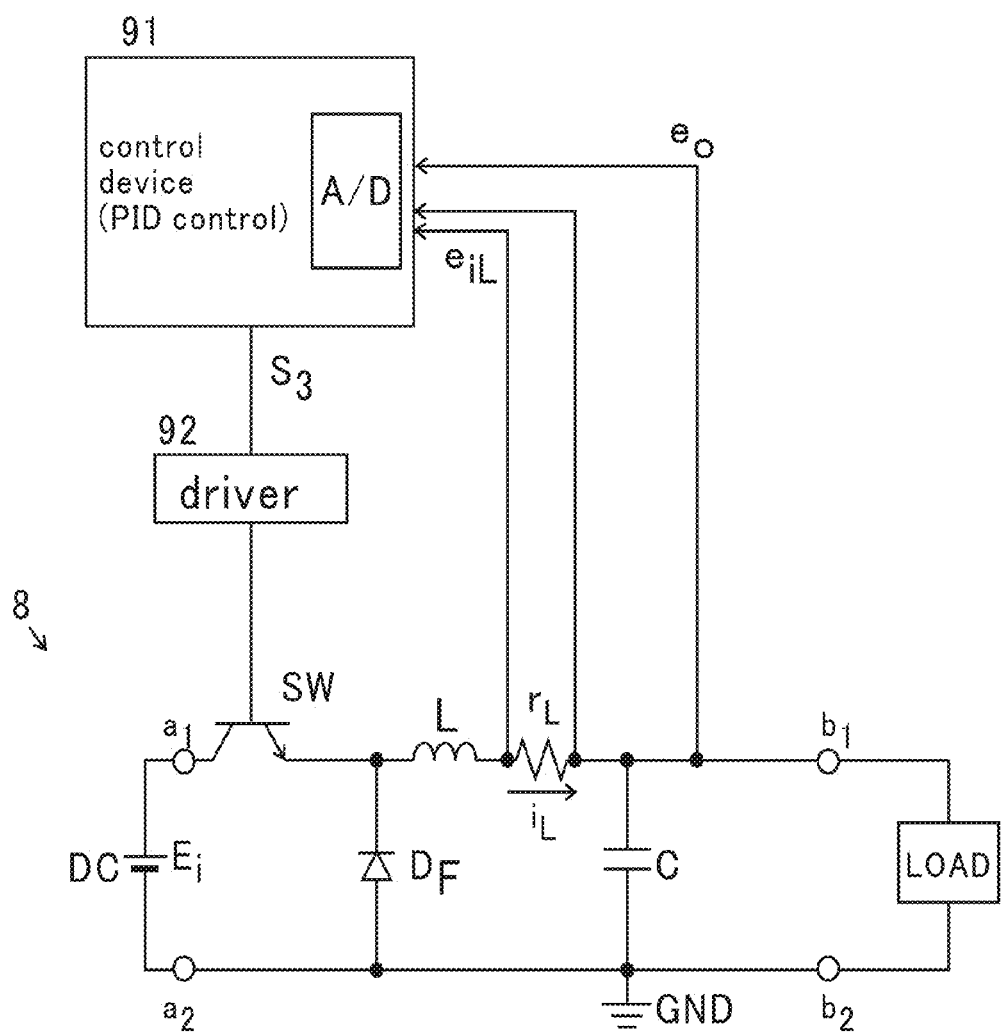
FIG. 26 is a block diagram which shows a conventional control device.
Figure 27:
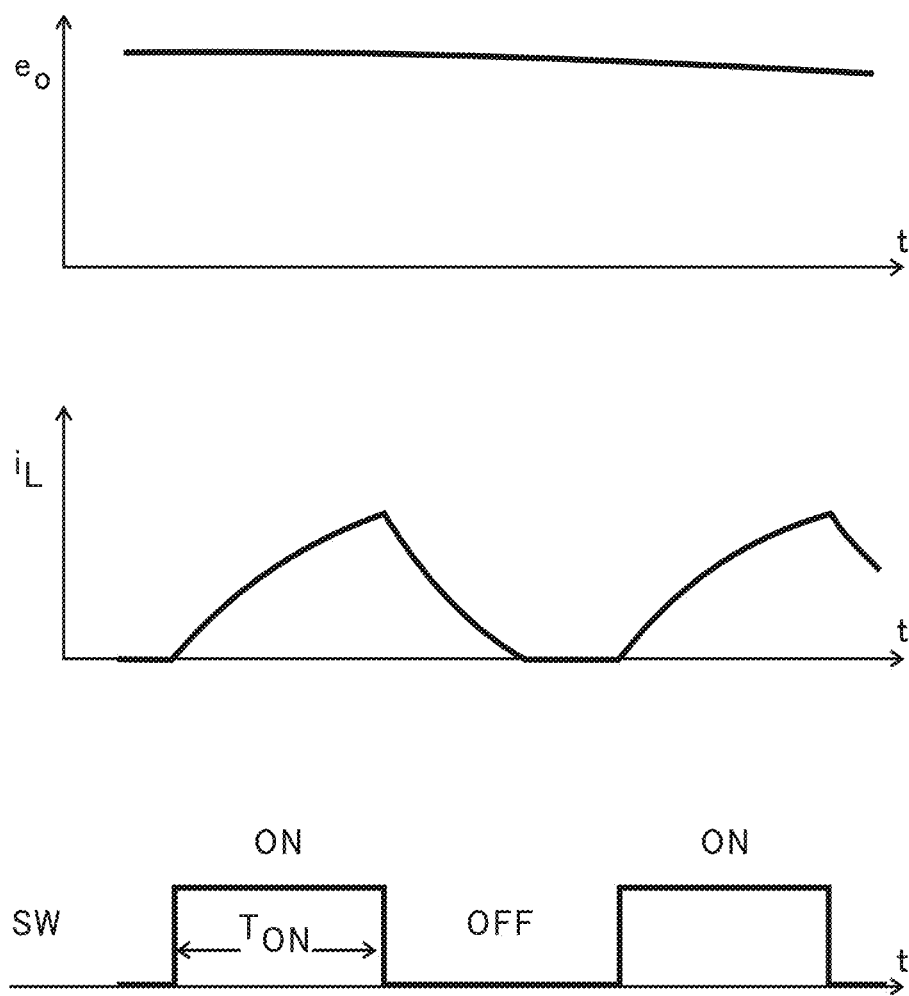

It is the figure showing the switch drive signal that output voltage input into a conventional control device shown in FIG. 26 [FIG. 27] and an inductor current and a control device generate.

FIG. 27 is a drawing showing output voltage input into a conventional control device (shown in FIG. 26), and an inductor current and the switch driving signal which the control device generates.

THE BEST MODE FOR CARRYING OUT THE INVENTION

The First Embodiment

FIGS. 1 to 5 show a basic structure of an embodiment of the present invention.

In FIGS. 1 to 5, a controlled object (1) is an actuator, a power inverter circuit or so on.

The controlled object (1) is controlled by a control device (2).

The control device (2) has a first (1st) control circuit (212) and a second (2nd) control circuit (222).

The second control circuit (222) outputs a switch timing signal (S2) to a driver (3).

Figure 1:
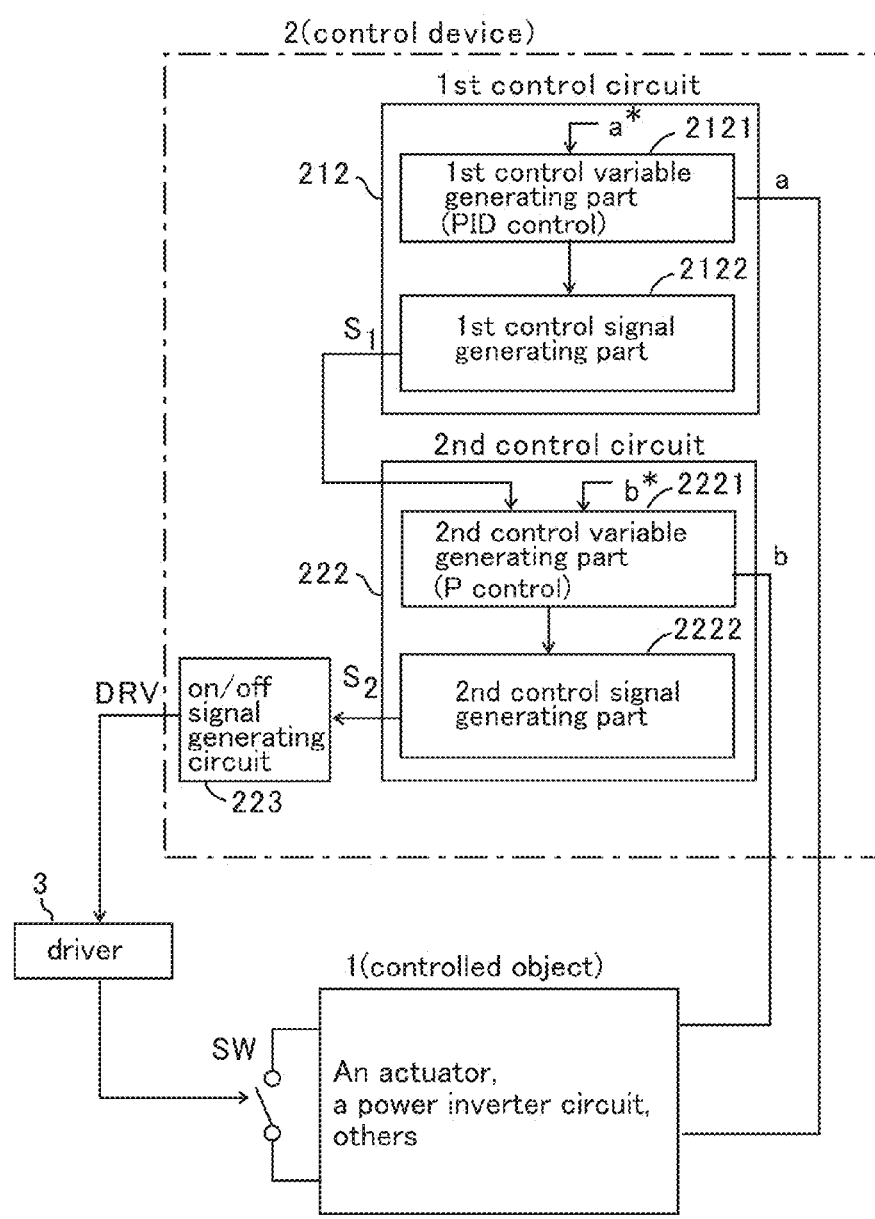
FIG. 1 is a block diagram which shows an example of the control device of the present invention.

In FIG. 1, the first control circuit (212) consists of a first controlled variable part (2121) and a first control signal generating part (2122).

The first controlled variable part (2121) generates a PID control variable based on an input signal (a).

The first control signal generating part ((2122) generates a first control signal (a timing signal such as a pulse or a stepped wave) based on a first controlled variable (PID control variable).

Alternatively, the second control circuit (222) consists of a second controlled variable part (2221) and a second control signal generating part (2222).

The second controlled variable part (2221) generates a P controlled variable.

The second control signal generating part (2222) generates a second control signal (a timing signal such as a pulse or a stepped wave) based on a second controlled variable (a P controlled variable).

In FIG. 1, a second control signal (S2) from the second control signal generating part (2222) is input into an on-off signal generation circuitry (223).

The on-Off signal generation circuit (223) outputs a switch drive signal (DRV) to a driver (3).

Figure 2:
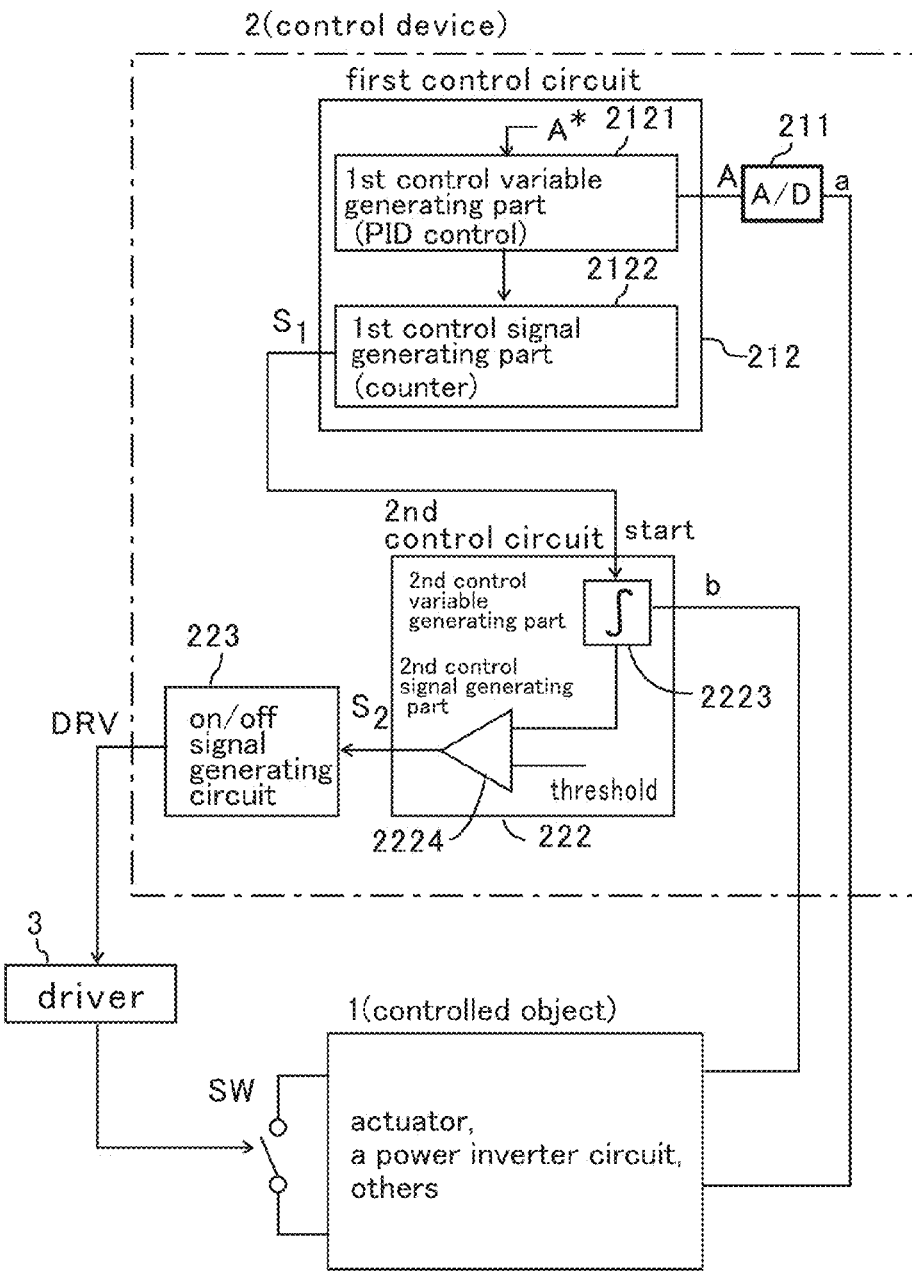
FIG. 2 is a block diagram which shows the other example of the control device of the present invention.

In FIG. 2, the first control circuit (212) consists of a first control variable generating part (a digital circuit) (2121) and a first control signal generating part (a counter) (2122).

The first control variable generating part (2121) generates a PID control variable.

The first control signal generating part (2122) generates a first control signal (a timing signal such as a pulse or a stepped wave) based on a first control variable (a PID control variable).

In FIG. 2, a first A/D converter (211) is connected to an input stage of the first control circuit (212).

In FIG. 2, the second control circuit (222) consists of a second control variable generating part (an integrating circuit) (2223) and a second control signal generating part (a operational amplifier) (2224).

The second control variable generating part (2223) generates the PID control variable.

The second control signal generating part (a counter) (2122) generates the second control signal (timing signal such as a pulse or a stepped wave) based on the second controlled variable (PID control variable).

The first A/D converter (211) converts an analog input signal (a) into a digital signal (A).

The first control variable part (2121) generates the first control variable (a PID control variable) from the digital signal (A) input and the desired value (A*).

In FIG. 2, the second control signal (S2) from the second control signal generating part (2222) is input into an on-off signal generation circuit (223).

The on-off signal generation circuit (223) outputs a switch drive signal DRV to the driver 3.

Figure 3:
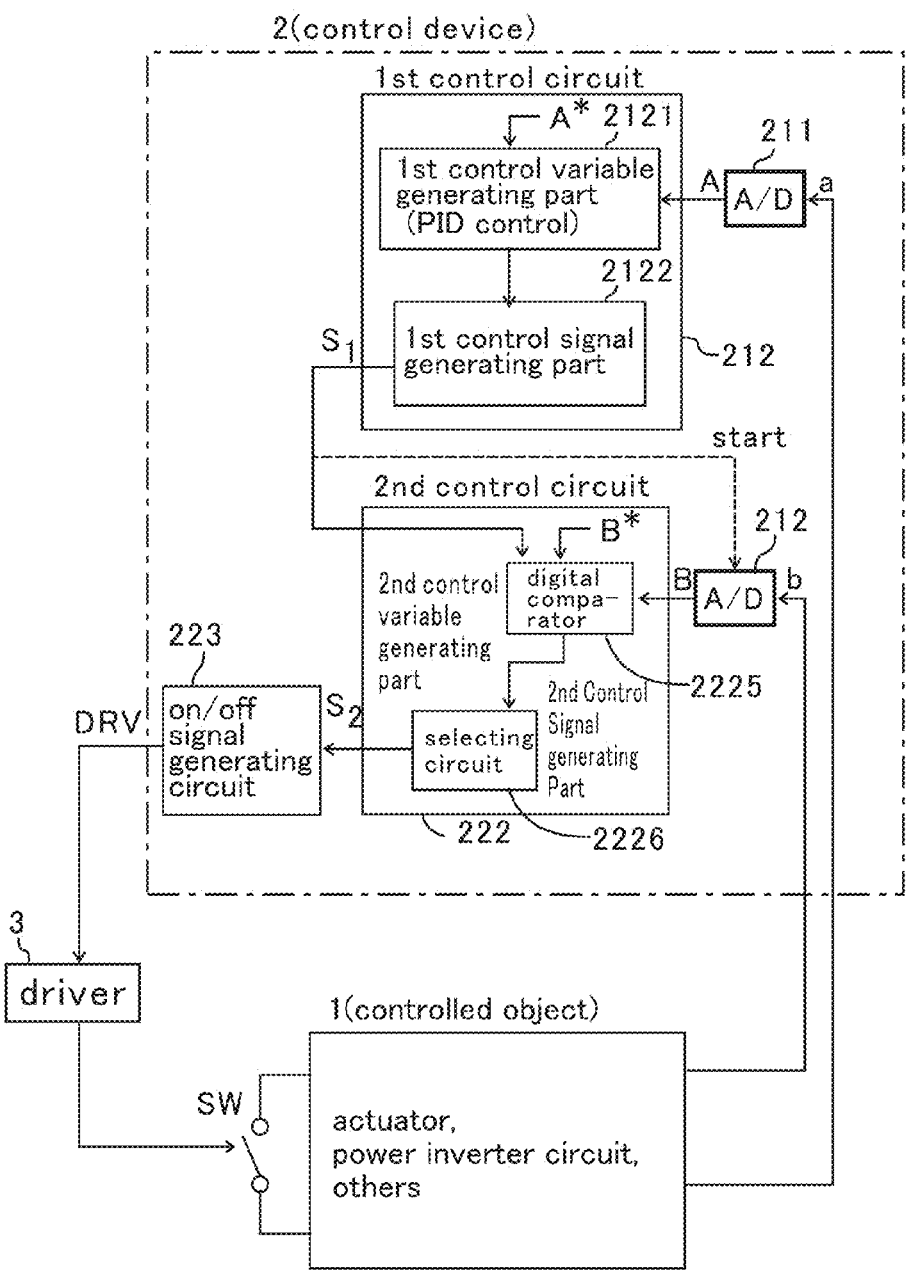
FIG. 3 is a block diagram which shows the other example of the control device of the present invention.

In FIG. 3, the first control circuit (212) consists of a first controlled variable generating part (a digital circuit) (2121) and a first control signal generating part (a counter) (2122).

The first controlled variable generating part (2121) generates the PID control variable, and the first control signal generating part (2122) generates the first control signal (a timing signal such as a pulse or a stepped wave) based on the first controlled variable (a PID control variable).

In FIG. 3, the second control circuit (222) consists of a second controlled variable generating part (digital comparator) (2225) and a second control signal generating part (a selecting circuit) (2226).

The second controlled variable generating part (2225) generates a PID control variable.

The second control signal generating part (2226) generates the second control signal (a timing signal such as a pulse or a stepped wave) based on the second controlled variable (a PID control variable).

In FIG. 3, the first A/D converter (211) is connected to an input stage of first control circuit (212), and the second A/D converter (211) is connected to an input stage of second control circuit (222).

The first A/D converter (211) converts an analog input signal (a) into digital signal (A).

The first controlled variable generating part (2121) generates the first controlled variable (a PID control variable) based on an input digital signal (A) and a desired value (A*).

The second A/D converter 211 converts an analog input signal (b) into a digital signal (B).

The second controlled variable generating part (2221) generates a second control signal from a digital signal (B) and a desired value (B*).

In FIG. 3, the second control signal (S2) from the second control signal generating part (2222) is input into a driver (3).

Alternatively, the second control signal (S2) is input into an on-off signal generating circuit that is not illustrated.

The on-off signal generating circuit (223) outputs a switch driving signal (DRV) to the driver (3).

In FIG. 4, the first control circuit (212) consists of first control signal generating part (digital circuit) (2123) and desired value signal generating part (2124).

First control signal generating part (digital circuit) (2123) generates basic time (S1) as the PID control quantity.

The desired value signal generating part (2124) generates a desired value (B*) of the second controlled variable.

In FIG. 4, the second control circuit (222) consists of a second control signal generating part (a delay circuit) (2122).

The second control signal generating part (a delay circuit) (2122) generates a second control signal (a timing signal such as a pulse or a stepped wave).

In FIG. 4, the first A/D converter (211) is connected to an input stage of a first control circuit (212).

Alternatively, the second A/D converter (221) is connected to an input stage of the second control circuit (222).

The first A/D converter (211) converts an analog input signal a into digital signal (A).

The first controlled variable generating part 2121 generates a first controlled variable (PID control quantity) based on the input digital signal (A) and the desired value (A*).

The second A/D converter (211) converts the analog input signal (b) into a digital signal (B).

The second control circuit (222) generates the second control signal from the input digital signal (B) and the desired value B*.

In FIG. 4, the second control signal (S2) from the second control signal generating part (2222) is input into the driver 23.

Alternatively, the second control signal (S2) is input into the on-off signal generating circuit that is not illustrated.

The switch driving signal (DRV) is input into the driver (3).

Figure 5:
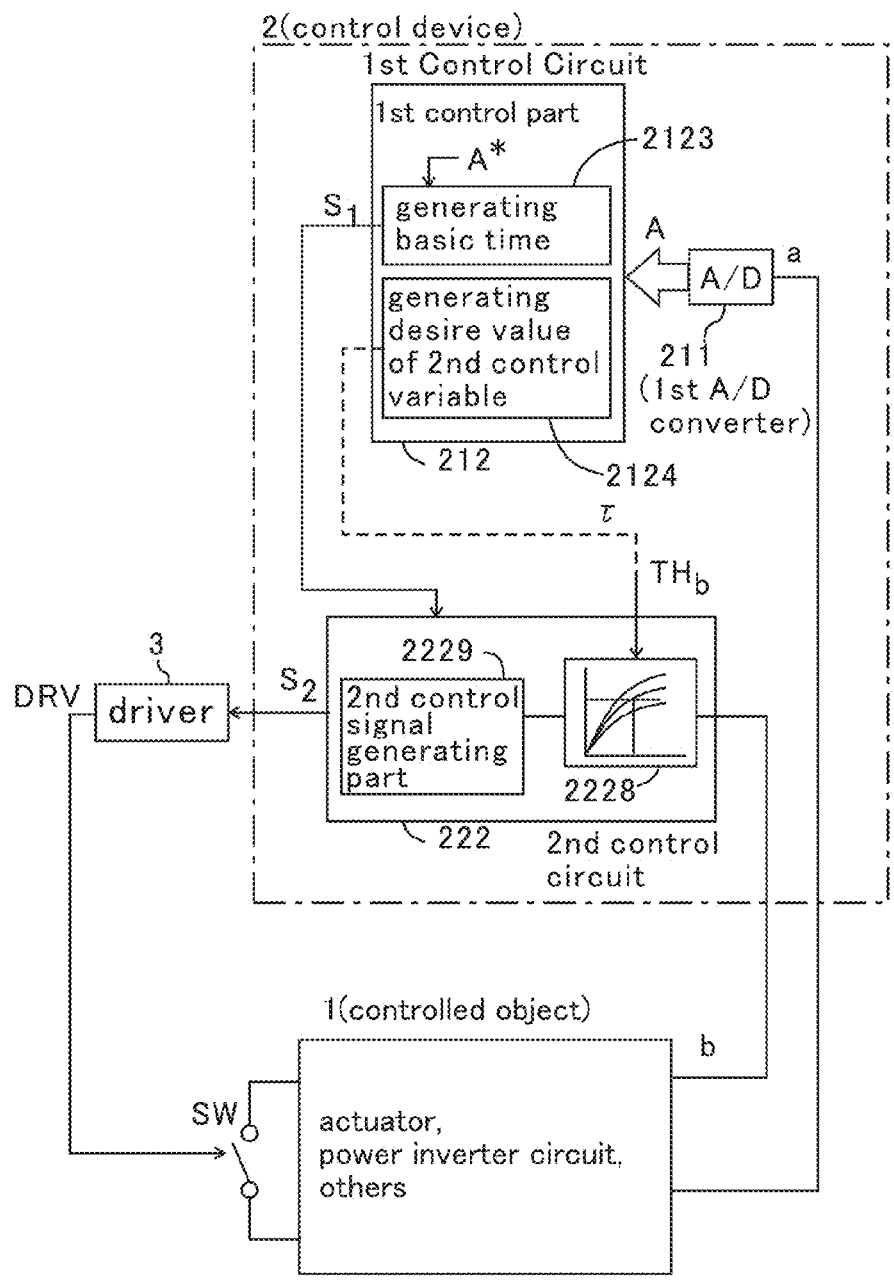
FIG. 5 is a block diagram which shows the other example of the control device of the present invention.

In FIG. 5, the first control circuit (212) consists of the first control signal generating part (digital circuit) (2123) and a desired value signal generating part (2124).

The first control signal generating part generates a basic time (S1) as the PID control variable.

The desired value signal generating part (2124) generates a threshold value (THb) of the second controlled variable.

In FIG. 5, the second control circuit (222) consists of a integrating circuit (2228) and a second control signal generating part (2229).

In FIG. 5, the integrating circuit (2228) generates a integral signal.

The second control signal generating part (2129) inputs a time signal from the integrating circuit (228).

The second control signal generating part (2129) generates the second control signal (a timing signal such as a pulse or a stepped wave) based on the time signal.

In FIG. 5, the first A/D converter (211) is connected to a input stage of the first control circuit (212).

The first A/D converter (211) converts an analog input signal (a) into a digital signal (A).

The first control variable part (2121) generates the first control variable (PID control variable) from an digital signal (A) and the desired value (A*).

The integrating circuit (228) integrates an analog input signal (b).

When an integral value reached the threshold value (THb), the integrating circuit (228) outputs a timing signal to a second control circuit (222).

The integrating circuit (228) generates the second control signal to the second control circuit (222) by an input timing of an analog input signal (b).

In FIG. 5, the second control signal (S2) from the second control signal generating part (2222) is input into a driver (3).

Alternatively, the second control signal (S2) is input into the on-off signal generating circuit that is not illustrated.

The switch drive signal (DRV) is input into driver (3).

The driver 3 drives a switch SW.

In FIG. 5, only one electric switch is illustrated.

However, the right of the present invention is not limited by the number of the switch.

For example, a controlled object may include a triphasic inverter. In this case, the number of the electric switch for the control may be three or six.

Figure 6:
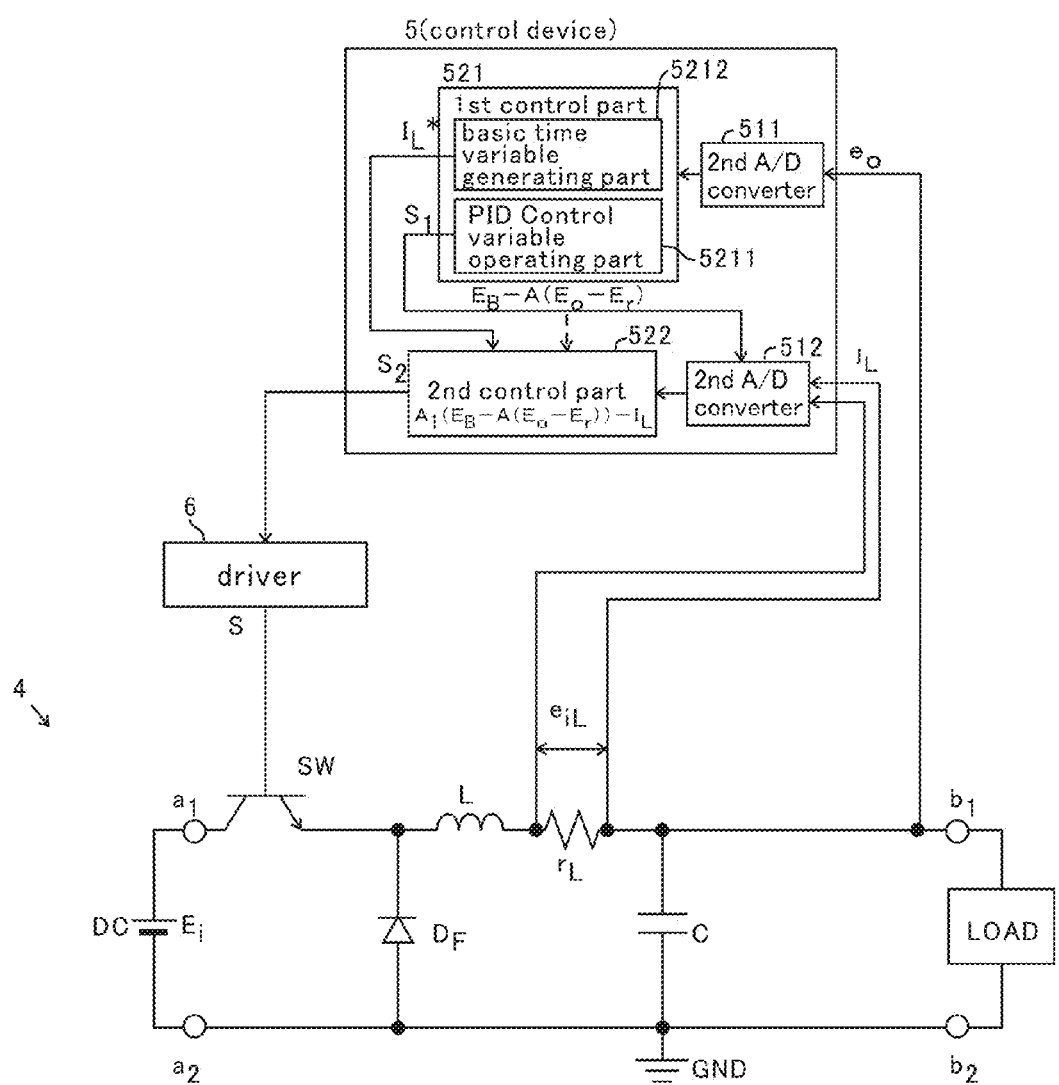
FIG. 6 is a block diagram which shows an example of the control device of the present invention applied to a power inverter circuit.

FIG. 6 is a circuit diagram showing a control device 5 of a DC/DC converter 4.

The DC/DC converter 4 of FIG. 6 corresponds to the controlled object 1 of FIG. 5.

The control device 5 of FIG. 6 corresponds to the control device 2 of FIG. 5.

An embodiment using a DC/DC converter of the step-down type is described below.

However, the control device 5 of FIG. 6 is applicable to a DC/DC converter of a step-up type and a step-up and -down type.

The output terminals of direct current power supply (DC) (voltage Ei) are connected to the input terminals (a1,a2) of the DC/DC converter (4).

The input terminal (a1) is connected to a switch (SW), and the switch (SW) is grounded through a diode (DF) for a commutation.

The connecting point between the electric switch (SW) and the diode (DF) is connected to an inductor (L).

A resistance (rL) for detecting inductor current is serially-connected to the inductor (L).

Even more particularly, the other terminal of the resistance (rL) for detecting inductor current is connected to an output terminal (b1), and the said other terminal is grounded through capacitor (C).

The Load (LOAD) is connected to output terminal (b1, b2).

(In b2 a Ground Terminal).

In FIG. 6, the control device (5) inputs an output voltage (eo) and a voltage value (eiL).

The voltage value (eiL) is corresponding to the inductor current (iL).

The control device (5) consists of a first control circuit (521) and a second control circuit (522).

The output voltage (eo) is input into the first control circuit (521) through an A/D converter (511), and the inductor current (iL) is input into the second control circuit (522) through an A/D converter (512).

The control device (5) outputs an on/off control signal (5) for the switch (SW) to driver (6).

The driver (6) is corresponding to the driver (3) of FIG. 5.

The driver (6) drives a switch (SW) based on on/off control signal (5).

Figure 7:
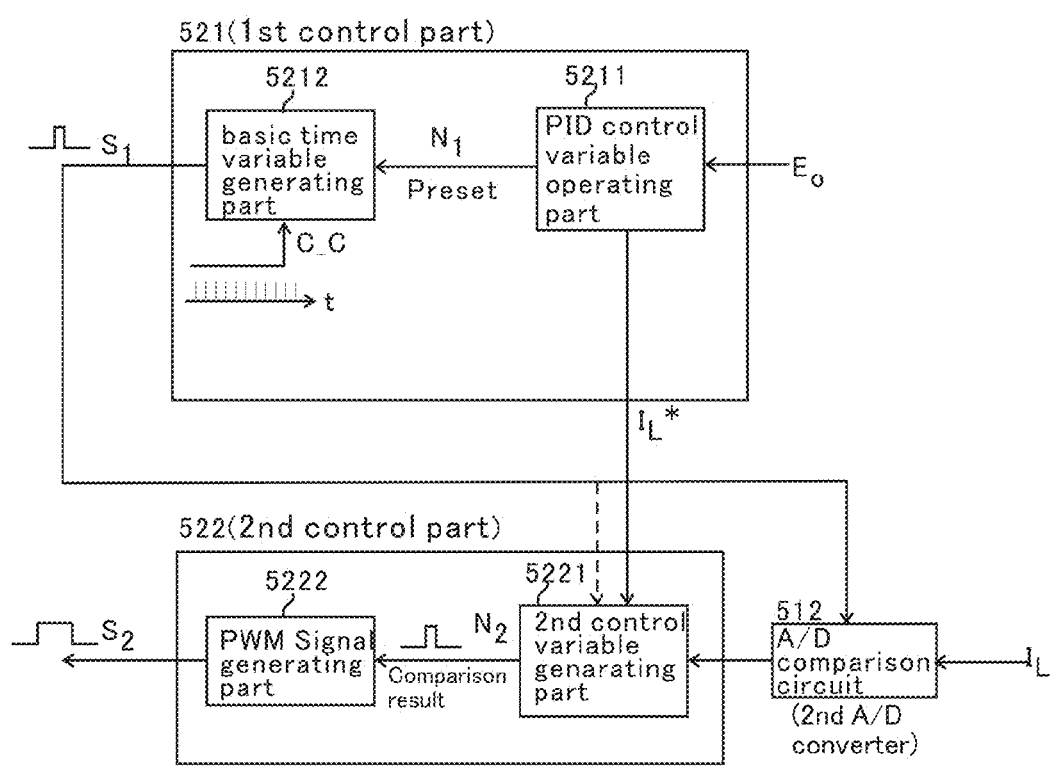
FIG. 7 is an explanatory diagram which shows the first control circuit and the second control circuit in the present invention of FIG. 6.

In this embodiment, the first control circuit (521) consists of a PID control quantity operation part (5211) and a basic time variable generating part (5212) as shown in FIG. 7.

The first control circuit (521) retards a reference timing signal (SCLK) a term corresponding to a controlled variable.

The first control circuit (521) thereby generates the operation start signal (S1).

The PID control portion (2211) can perform PID control.

For example, the PID control portion 2211 calculates a PID control variable by the next (1) expression.

$$EB-KP(Er-Eo,N)-KI\Sigma(Er-Eo,j)-KP(dEo,N/dt) \quad (1)$$

KP, KI, KP are proportional constants.

Eo,N is an output voltage digital value. N is a subscript showing the sampling time.

Er is a digital value of a comparison voltage (a reference voltage).

EB is a base voltage.

$\Sigma(Er-Eo,j)$ is accumulated value of the deviation of Eo,j and Er until sampling time N.

The basic time variable N1 represented by the next expression is determined based on the PID control variable.

$$N1=NEB-kP(NEr-No,N)-kI\Sigma(NEr-No,j)-kD(dNo,N/dt) \quad (2)$$

kP, kI, kD are proportional constants corresponding to the said KP, KI, KD.

No,N is a numeric value corresponding to output voltage digital values Eo,N. N is a subscript showing the sampling time.

NEr is a numeric value corresponding to the comparison voltage Er.

NEB is a numeric value corresponding to the base voltage.

Alternatively, the PID control variable operation part (5211) generates desired value (IL*) of the inductor current.

In the present embodiment, the first control circuit (512) works so that the first controlled variable decrease.

That is, the first control circuit (212) works to advance a output timing of the operation start signal S1.

At the same time, based on a desired value signal (SH (B*)) which the first control circuit 212 outputs, a control of signal (A) is performed.

That is, a control delay of the second A/D converter (221) is compensated by the operation start signal S1.

Alternatively, the response delay of the first controlled variable to come from a past sampling that the first control circuit has is compensated by the value of the second controlled variable.

In this embodiment, the second control circuit (522) has the second control variable generating part (5221) and the PWM signal generating part (5224) as shown in FIG. 6.

The second control variable generating part (5221) starts as shown in FIG. 7 specifically by the operation start signal (S1) from the first control circuit (521).

And the second control variable generating part (5221) generates the second time variable (N2) from an inductor current (iL) and an inductor current desired value (iL*).

The inductor current (iL) is an input signal of the second controlled variable generating part (5221), and the inductor current desired value (iL*) is a value preset.

Figure 8:
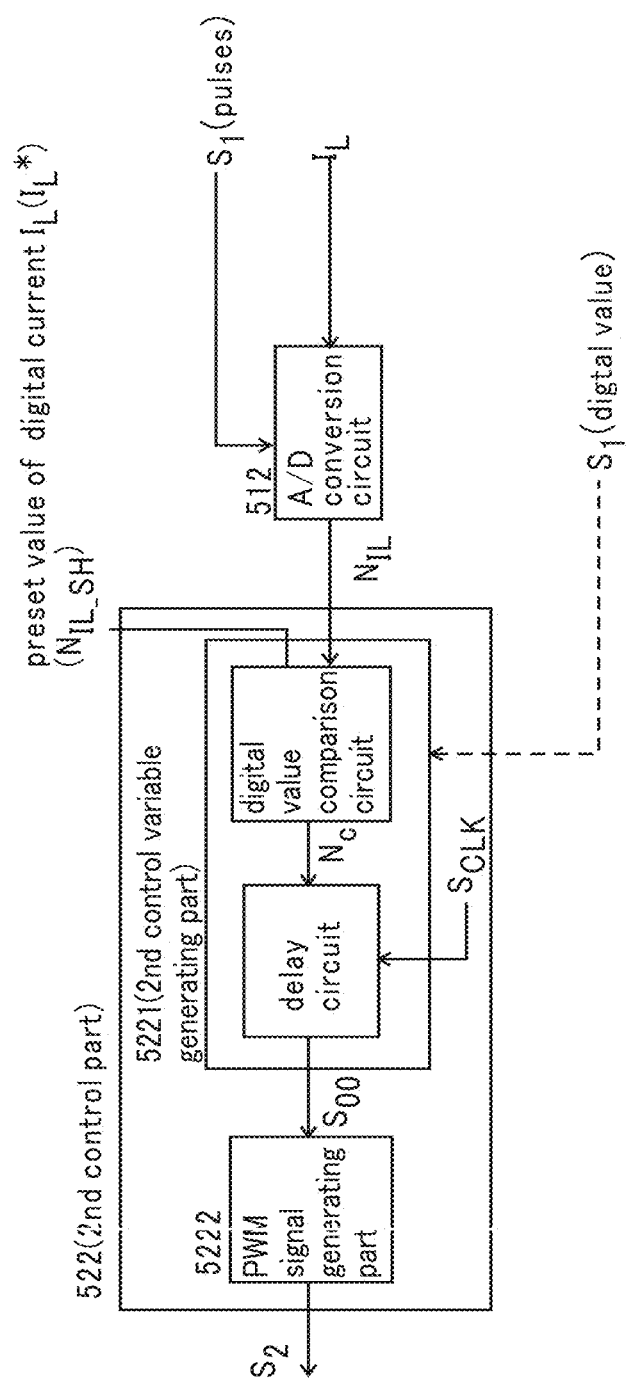
FIG. 8 is an explanatory diagram showing the second control circuit in detail.

As shown in FIG. 8, the digital values comparison circuit compares a digital values (NIL) corresponding to the inductor current (iL) and a desired value (iL*: the digital values is NIL_SH) of the inductor current (iL).

The digital value comparison circuit outputs a comparison result (a digital values (NC)).

The delay circuit receives digital values (NC).

The delay circuit delays the output timing of the digital values (NC) as a signal (S00).

The delay time is determined by the operation start signal (S1).

The signal (S00) is input into a PWM signal generating part (5224), and the PWM signal generating part (5224) generates a signal (S2) which determines the second time variable.

Note that, in the present embodiment, the second A/D converter (221) starts to work by the operation start signal (S1).

The second control circuit (522) generates the signal (S00) based on the signal from the second A/D converter (221).

However, the second control circuit (522) receives the operation start signal S1, and it may be driven by the timing as shown in a broken line in FIG. 6, FIG. 7, FIG. 8.

Figure 9:
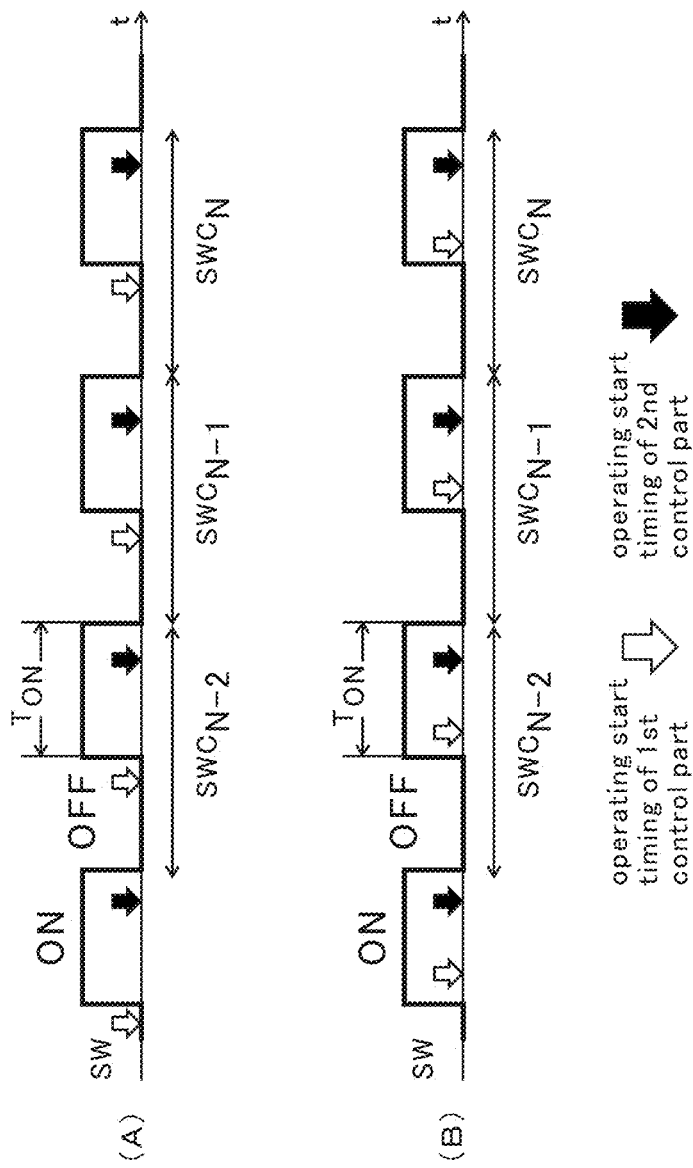
FIG. 9 is a timing chart which shows the electric switch driving a signal which the control device shown in FIG. 6 generates.

In this embodiment, as shown in FIG. 9 (A), the first control circuit (521) may start the control before starting a switching cycle TCN (or before end of the last switching cycle TCN-1).

The switching cycle TCN is a cycle of this change timing.

Also, as shown in FIG. 9 (B), the first control circuit (521) can start the control at the same time that switching cycle TCN is started (or after start).

Figure 10:
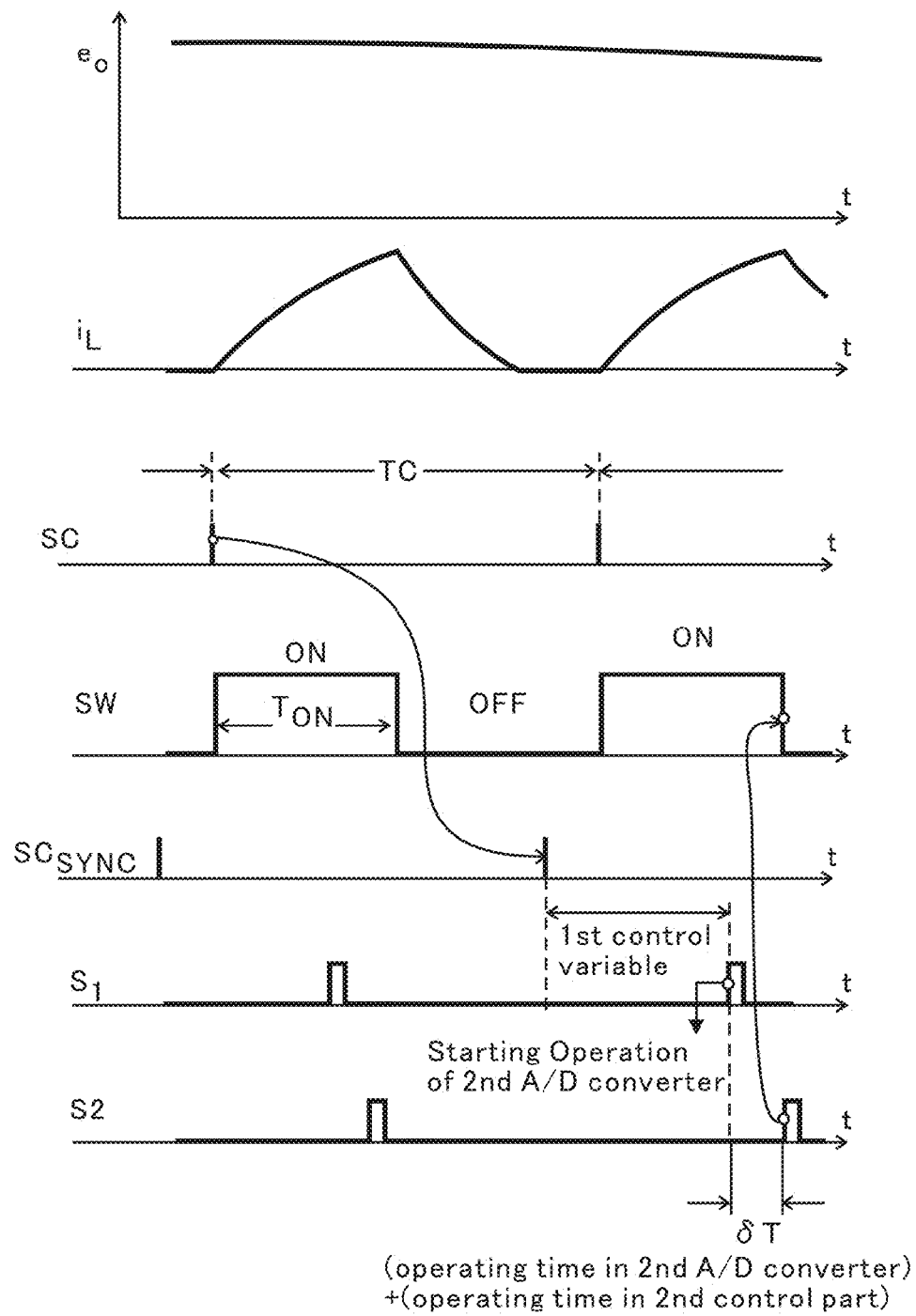
FIG. 10 is a figure showing relations of an output voltage eo, an inductor current iL, a switching period synchronizing signal SCSYNC, an operating state of a switch SW and an operation start signal S1.

Relations of the output voltage (eo), the inductor current (iL), the operating state of the switch (SW) and the operation start signal (S1) are shown in FIG. 10.

In FIG. 10, the first control circuit (521) starts an operation by the synchronizing signal (SCSYNC) in the switching period.

The synchronizing signal (SCSYNC) synchronizes in signal (SC) to generate switching cycle (TC) in switching period.

When the time corresponding to the first controlled variable (a time variable) passed, the first control circuit (521) generates an operation start signal (S1).

In this embodiment, the second control circuit (522) starts by the operation start signal (S1) from the first control circuit (521).

In addition, the second control circuit (522) generates the second time variable (N2) from an inductor current (iL).

The second control circuit (522) can generate a detecting signal from an electric switch current iSW, a current iFD, an output voltage eo or an output current iO.

In this embodiment, reactor current iL is a variable (the reactor current iL is generated by the first control variable operation part (5211)).

However, the reactor current iL may be the constant.

Second Embodiment

Figure 11:
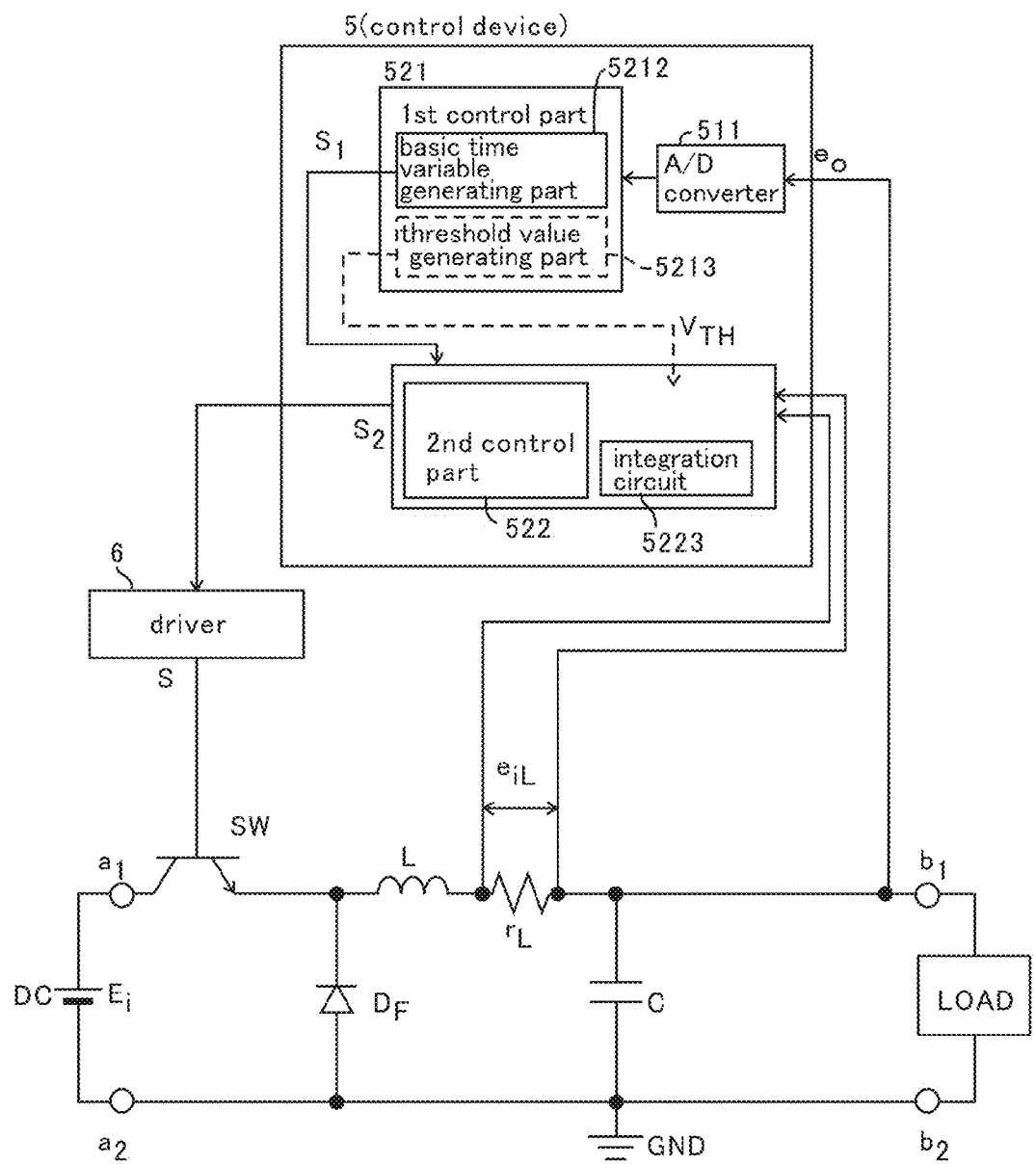
FIG. 11 is a circuit diagram which shows the control device 5' of the present invention applied to a DC/DC converter.

FIG. 11 is a circuit diagram which shows the control device 5 of the DC/DC converter 4.

In this embodiment, the second control part (522) comprises the second control variable generating part (an analog integrating circuit (5223)) and a PWM signal generating part (5222) as shown in FIG. 12 (A).

The analog integrating circuit (5223) starts by an operation start signal (S1) from a first control part (521).

The analog integrating circuit (5223) starts an integration of the voltage corresponding to an inductor current (iL) input.

As shown in FIG. 12 (B), the time when the terminal voltage VCR of the capacitor C1 reached threshold VTH is a time TON,2.

The time TON,2 corresponds to the second amount of time N2.

At this time, the PWM signal generating part (5222) outputs the second control signal (S2).

Hereafter, an integral action of the analog integrating circuit (5223) is reset by reset signal (RST).

Note that, in the present embodiment, the threshold VTH is a constant voltage.

Figure 13:
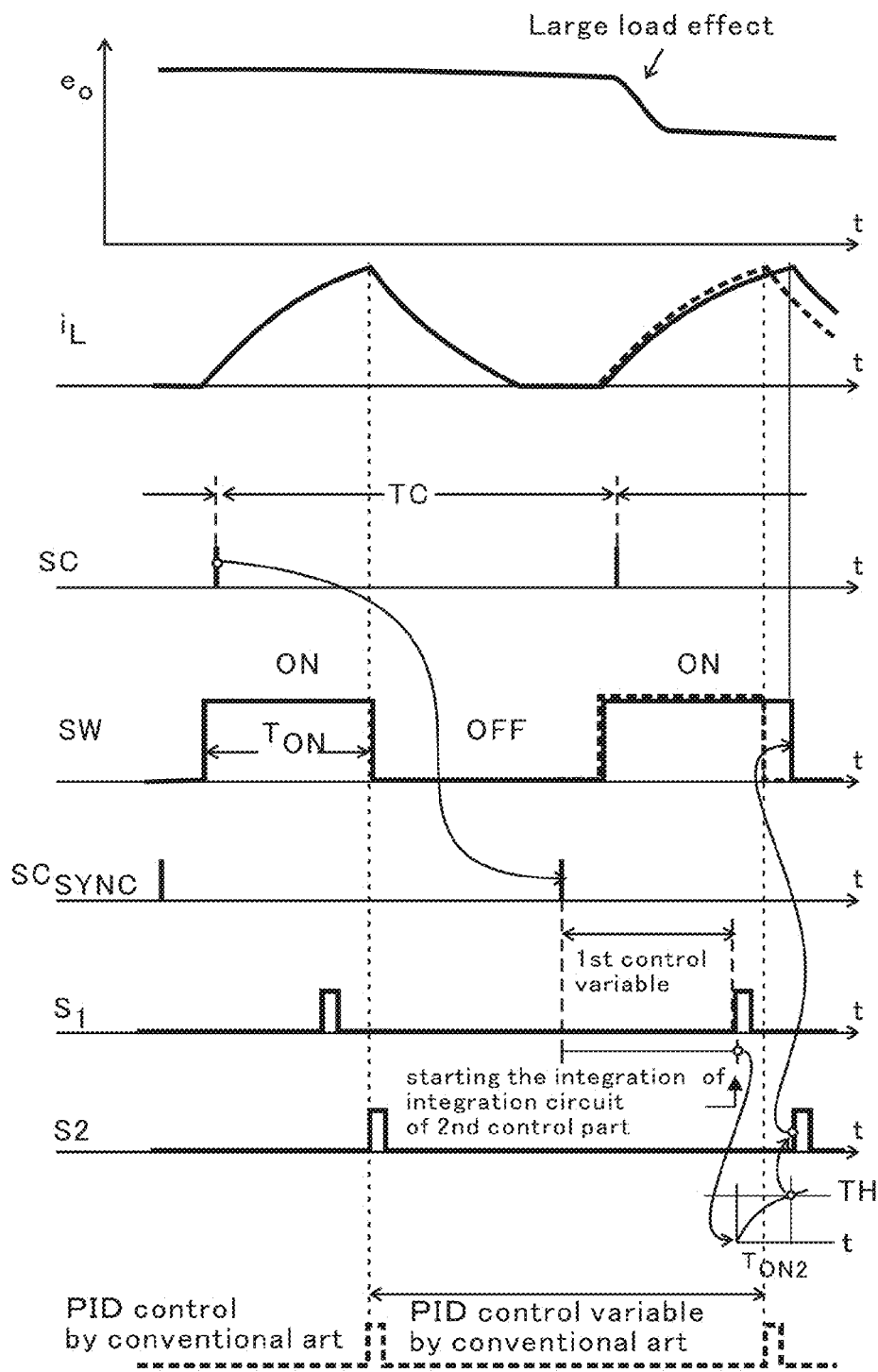
FIG. 13 is a drawing which shows relations of the output voltage eo, the inductor current iL, the operating state of the switch SW and the operation start signal S1 in the second embodiment.

FIG. 13 shows relations of an output voltage eo, an inductor current iL, an operating state of switch SW and an operation start signal S1.

In FIG. 13, the first control part (521) starts an operation by a switching period synchronizing signal (SCSYNC).

The switching period synchronizing signal (SCSYNC) synchronizes to the signal (SC) which generates a switching cycle (TC).

When the time corresponding to the first controlled variable (a time variable) passed, the first control part (521) generates an operation start signal (S1).

The control in the first control part (521) is the above-mentioned PID control.

In the PID control is a discrete value control.

When the end of the TON period of the switch SW is determined by merely a first control part,
a delay due to the operating time of A/D converter (511) and a delay due to the computing speed of the basic time variable generating part (5212) reduce an accuracy of measurement.

In this embodiment, at the same time to control integral start time by operation start signal S1, control with integrating circuit 5223 is carried out.

The control in the second control part (522) is the said proportional control by the integrating circuit (5223) and the threshold (VTH).

The control in the second control part (522) is a continuous-valued control.

Therefore, the present value of the voltage corresponding to inductor current iL is reflected to the control.

The end of the TON period of electric switch SW is thereby determined with high accuracy.

That is, the time to reach threshold VTH becomes longer when the voltage corresponding to inductor current iL is low.

The end of the TON period of electric switch SW becomes thereby late.

Therefore, the output voltage eo is adjusted to become higher.

The time to reach threshold VTH becomes shorter when the voltage corresponding to inductor current iL is high.

In this case, the end of the TON period of the switch SW becomes early, the output voltage eo is thereby adjusted to lower.

As described earlier, in the present invention embodiment, the end of the TON period of the switch SW is determined by the discrete value control and the continuous-valued control.

The first control part (521) provides the discrete value control, and the second control part (522) provides the continuous-valued control.

By combining the continuous-valued control in the second control part (522) and the discrete value control in the first control part (521), high response and high precise control are carried out.

Note that, in the present embodiment, a threshold value generating part 5213 can be added to the first control part 521 as indicated by a broken line in FIG. 11.

For corresponding to the change of the desired value of the output voltage, the threshold value generating part (5213) can change the threshold value of the integrating circuit (5223).

According to the present invention, a plurality of integrators can be connected in parallel when an input range of the integrating conversion is wide.

The plurality of integrators are different in a time constant.

Because the time constants are different, the working range of the integrator is changed.

An integrator which inputs the voltage value (eiL) can be selected from the plurality of integrators.

An integrator which outputs the output signal can be selected from the plurality of integrators.

In addition, an integrator can be set so that the center of the integral range of the integrator corresponds to a desired value (NIL_SH) of the inductor current iL.

In this case, an integral effect (value of the IL) may not reach the effective range of the integrator.

The first control part (521) generates the operation start signal (S1) then to advance an integral start timing.

In addition, an integral effect (value of the IL) is sometimes beyond the effective range of the integrator.

The first control part 521 generates an operation start signal (S1) then to delay the timing of the integral start.

Figure 14:
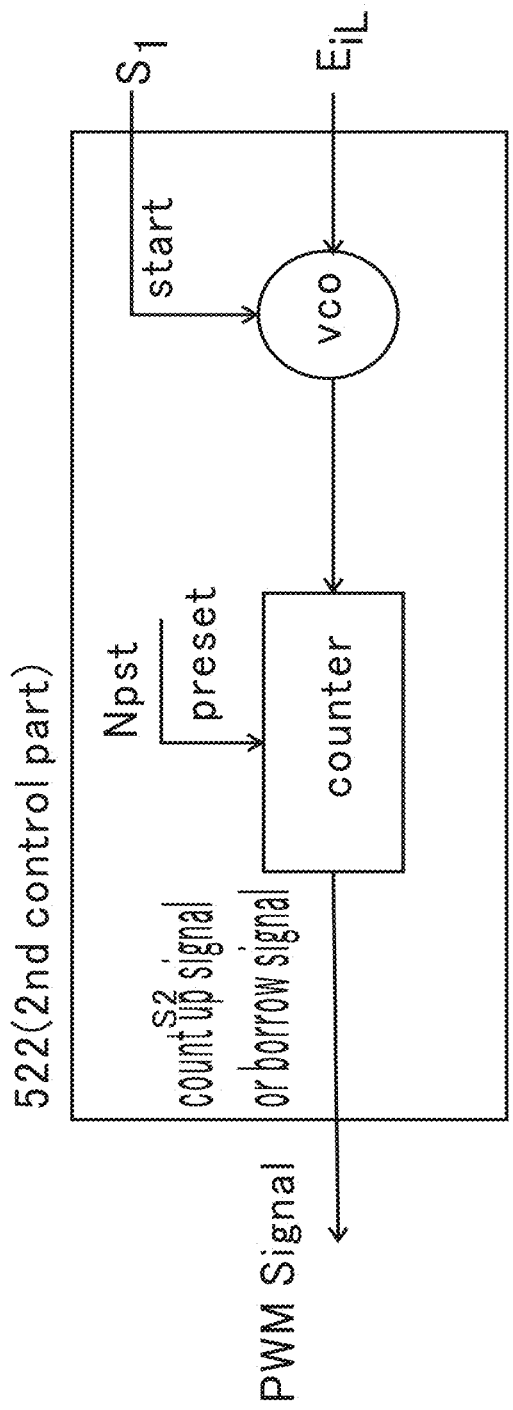
FIG. 14 is a drawing which shows a change example of the second embodiment, wherein the second control circuit consists of a VCO and a counter.

FIG. 14 is a figure which shows a change example of the second embodiment.

In FIG. 12, second control circuit (522) consists of a VCO (5226) and a counter (5227).

The VCO (5226) inputs a reactor voltage (eIL).

The VCO (5226) starts driving by inputting an operation start signal (S1).

On the other hand, the preset value (Npst) is input into a counter (5227) every switching cycle.

The counter (5227) outputs a counting up signal (or a rag signal) as PWM signal (S2).

In the present embodiment, while the control of the integral start time is performed by the operation start signal (S1), the control by the VCO (5226) and the counter (5227) is performed.

Figure 15:
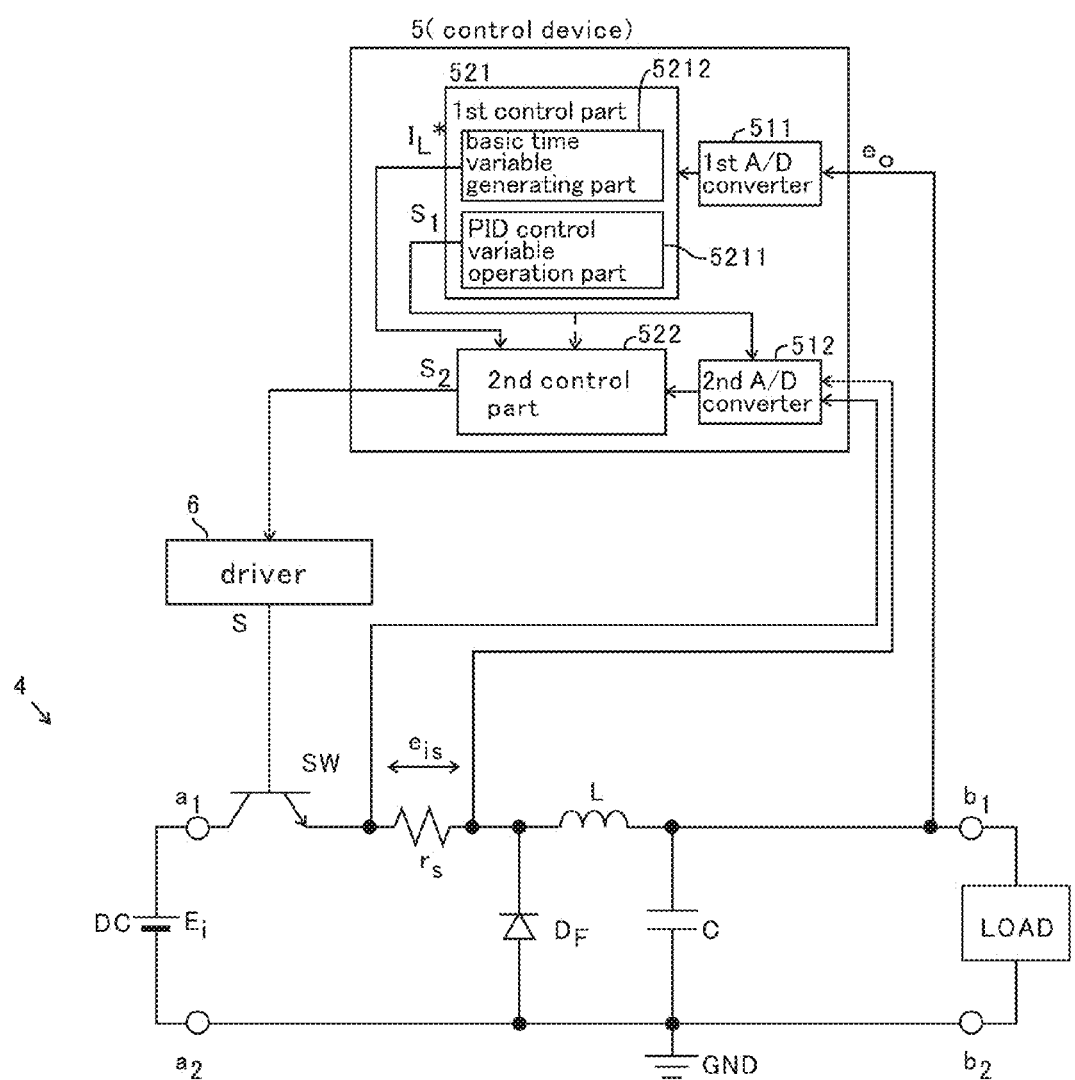
FIG. 15 is a drawing which shows a circuit used for an example of the present invention.

FIG. 15 is a figure showing circuitry used for an example of the present invention.

Figure 16:
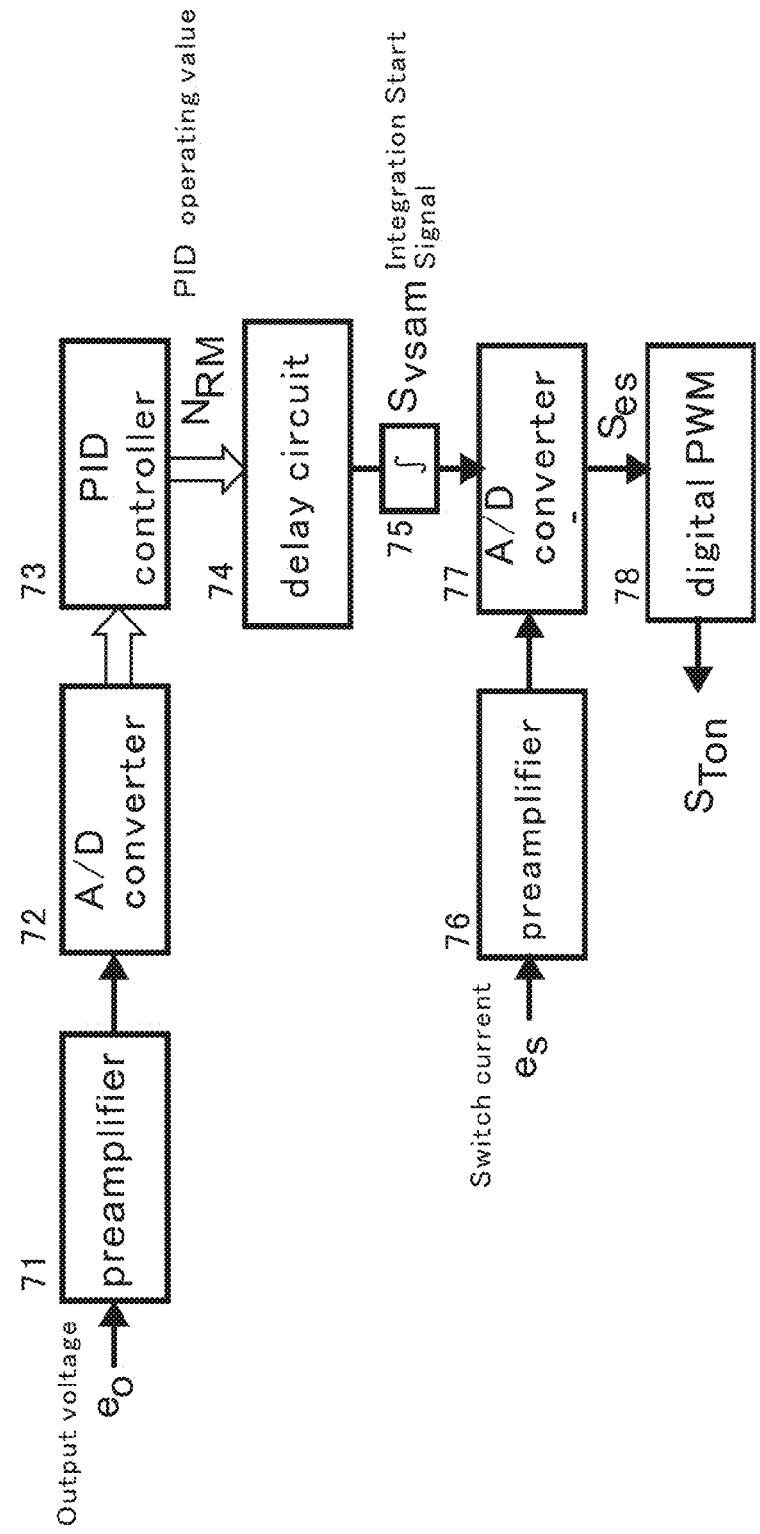
FIG. 16 is a drawing which shows the elaboration of the control part in the circuit of FIG. 15.

FIG. 16 is a drawing showing a control part in the circuitry of FIG. 15 in detail.

Figure 17:
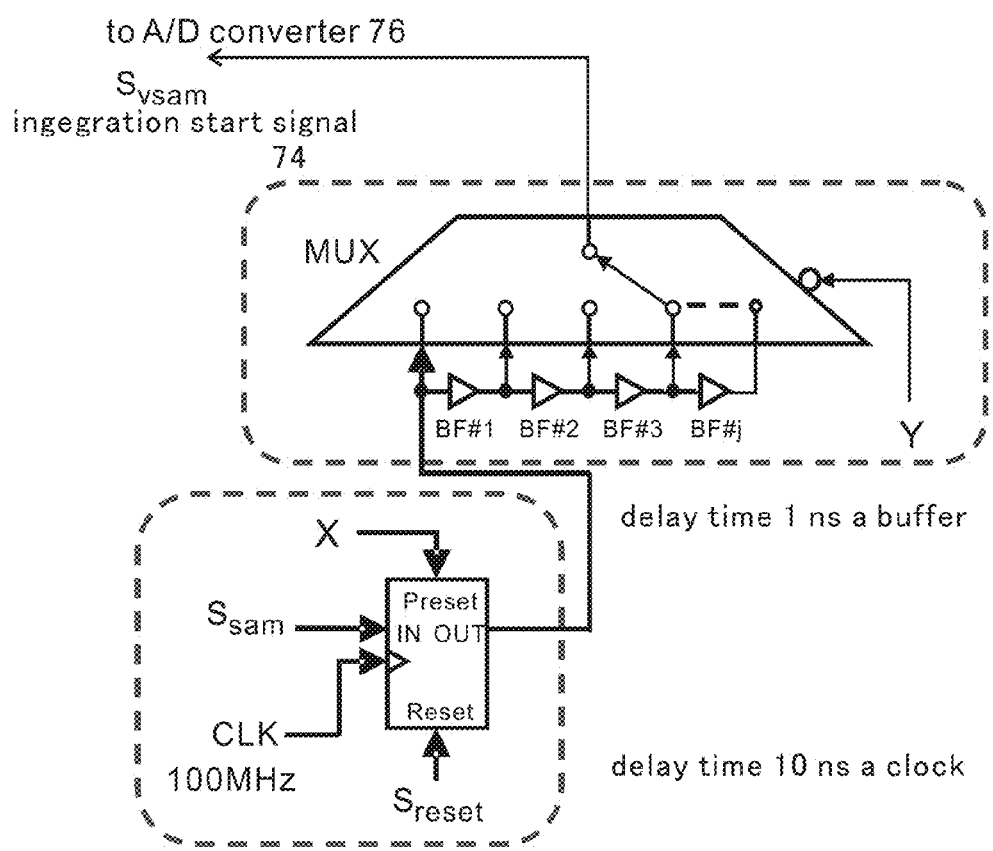
FIG. 17 is a figure shown in the elaboration with delay circuit.

FIG. 17 is a figure showing a delay circuit of FIG. 16 in detail.

FIG. 18 (A) is a figure showing the integrating circuit in FIG. 16, and FIG. 18 (B) and FIG. 18 (C) are drawings showing the circuit operation of FIG. 18 (A).

Figure 19:
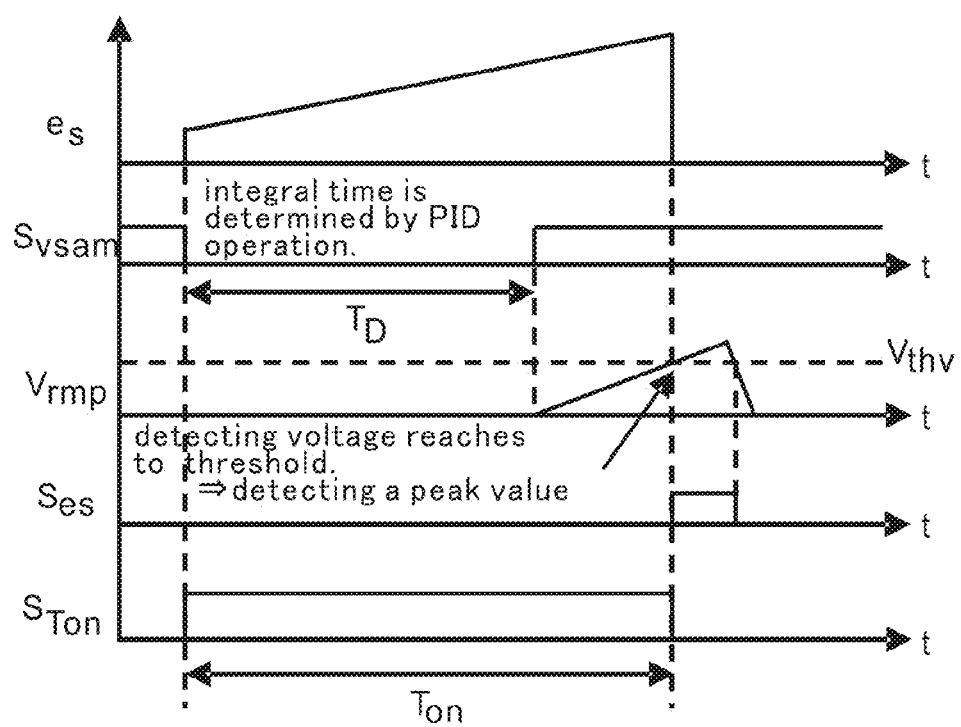
FIG. 19 is an operation wave form chart of the circuitry of FIG. 15.

FIG. 19 is an operation wave form chart of the circuit of FIG. 15.

FIG. 20 is a figure which shows the simulation results of the voltage mode (a simulation result of the prior art).

FIG. 21 is a figure which shows the experiment result of the voltage mode (an experiment result of the prior art).

FIG. 22 is a figure which shows a simulation result of the current mode (the present invention) by using the parameter same as the voltage mode (the prior art).

FIG. 23 is a drawing which shows an experiment effect of the current mode (the present invention) by using the parameter same as the voltage mode (the prior art).

FIG. 24 is a drawing which shows a simulation effect of the current mode by an adjusted parameter (a simulation result of the present invention).

Figure 25:
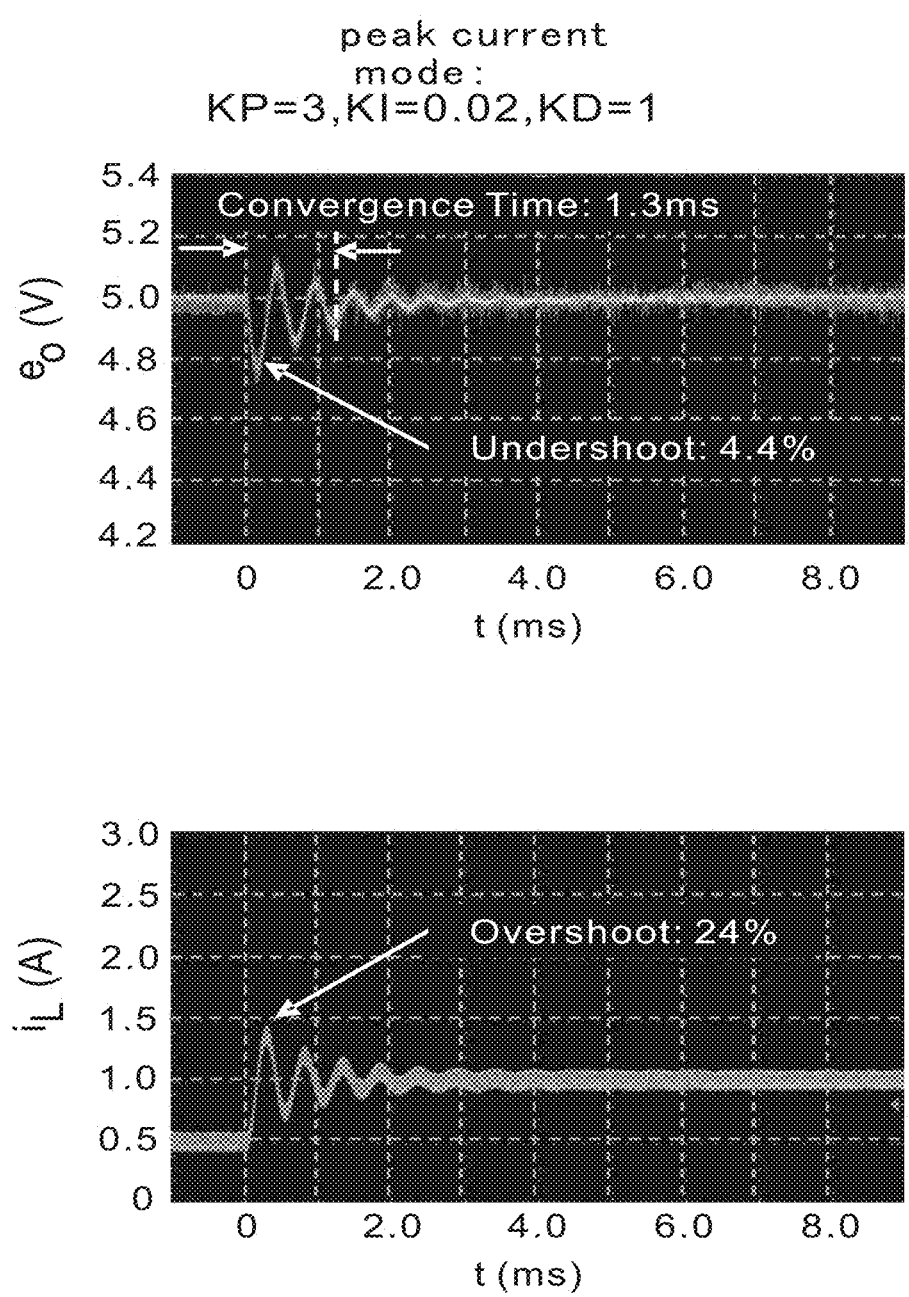
FIG. 25 is a drawing which shows an experiment effect of the current mode (the present invention) by adjusted parameters.

FIG. 25 is a drawing which shows an experiment result of the current mode by adjusted parameters (an experiment result of the present invention).

EXPLANATIONS OF THE LETTERS OF NUMERALS 1,5: controlled object
2, 5': control device
3, 6: driver
4, 8: DC/DC converter
91: control device
92: drive circuit
211: first A/D converter
212,521: first control circuit
221: second A/D converter
222,522: second control circuit
511,512: A/D converter
2211, 5211 PID control variable arithmetic logical unit
5212: basic time variable generating part
5221: second control variable generating part
5224: PWM signal generating part
5225: analog integrating circuit
5226: VCO
5227: counter
C, C1: capacitor
DC: DC power supply
DF: diode
IL: digital detected value
L: inductor
LOAD: load
SW: switch
rL: resistance for detecting inductor current

The invention claimed is:

1. A control device which controls an output of a controlled object by driving at least one switch in the controlled object by using an on-signal and an off-signal comprising:
a first control circuit which consists of a first control variable generating part and a first control signal generating part, wherein the first control variable generating part receives one or more first detecting signals, and generates a first time value as a first control variable based on the first detecting signal, the first control signal generating part outputs a first control signal to a second control circuit when the first time value passes from a reference time synchronizing with the on-signal or the off-signal;

the second control circuit which consists of a second control variable generating part and a second control signal generating part, wherein the second control variable generating part receives one or more second detecting signals, and generates a second time value as a second control variable based on the second detecting signal, the second control signal generating part outputs a second control signal to an on-off signal generating circuit when the second time value passes from a time when the first control signal is received from the first control circuit; and the on-off signal generating circuit which receives the second control signal from the second control circuit, and generates the on-signal and the off-signal.

2. The control device according to claim 1:

wherein the first control variable that the first control variable generating part generates is the control variable including one or both of an integral control element and a derivative control element, and the second control variable that the second control variable generating part generates is a proportional control element.

3. The control device according to claim 1: wherein the first control circuit is a digital circuit including an A/D converter which converts the first detecting signal into a digital signal, the first control signal generating part is a counter which counts the first time value generated by the first control variable generating part and outputs a count-up signal at counting up.

4. The control device according to claim 1: wherein the second control circuit includes an analog integration circuit integrating the second detecting signal, and the second control signal generating part is a voltage comparator which compares a predetermined threshold voltage with an output voltage of the analog integration circuit.

5. The control device according to claim 4: wherein the first control signal includes information to set a time constant of the analog integration circuit, or includes information to change the predetermined threshold voltage of the voltage comparator.

6. The control device according to claim 1: wherein the second control circuit is a digital circuit comprising an A/D converter which converts the second detecting signal into a digital signal, a digital comparator which compares a predetermined voltage value with an output of the A/D converter, and a delay circuit which delays an output signal of the digital comparator.

7. The control device according to claim 6: wherein the first control signal includes an operation start signal of the A/D converter of the second control circuit.

8. The control device according to claim 6: wherein the first control signal includes information to set a delay time of the delay circuit.

9. The control device according to claim 1, wherein the second control circuit is a digital circuit comprising a voltage control oscillator which inputs the second detecting signal, and a counter which counts output pulses of the voltage control oscillator and outputs the second control signal at counting up to a preset value.

10. The control device according to claim 9, wherein the first control signal includes an operation start signal of the voltage control oscillator.

11. The device according to claim 9, wherein the first control signal includes information to set the preset value of the counter.

12. The control device according to claim 1, wherein the controlled object is a power converter circuit.

13. The control device according to claim 12, wherein the power converter circuit repeats accumulation and release of energy to an inductor.

14. The control device according to claim 13: wherein the first detecting signal includes a detection signal of an output voltage of the power converter circuit; and the second detecting signal includes a detection signal of a current flowing through the switch in the power converter circuit, or a detection signal of a current flowing through the inductor in the power converter circuit.

* * * * *